US011523658B2

(12) United States Patent
Langvin et al.

(10) Patent No.: US 11,523,658 B2
(45) Date of Patent: Dec. 13, 2022

(54) ADJUSTABLE MULTI-BLADDER SYSTEM FOR AN ARTICLE OF FOOTWEAR

(71) Applicant: NIKE, Inc., Beaverton, OR (US)

(72) Inventors: Elizabeth Langvin, Sherwood, OR (US); James Molyneux, Portland, OR (US); Lee D. Peyton, Portland, OR (US); Ty A. Ransom, Portland, OR (US); Nicola J. Reynolds, Hillsboro, OR (US); Aaron B. Weast, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 922 days.

(21) Appl. No.: 16/375,889

(22) Filed: Apr. 5, 2019

(65) Prior Publication Data

US 2019/0297998 A1 Oct. 3, 2019

Related U.S. Application Data

(60) Continuation of application No. 15/643,892, filed on Jul. 7, 2017, now Pat. No. 10,278,449, which is a division of application No. 14/730,319, filed on Jun. 4, 2015, now Pat. No. 9,730,488, which is a (Continued)

(51) Int. Cl.
| | |
|---|---|
| *A43B 13/20* | (2006.01) |
| *A43B 7/145* | (2022.01) |
| *A43B 7/144* | (2022.01) |
| *F16K 11/076* | (2006.01) |
| *F16K 15/18* | (2006.01) |
| *F16K 15/20* | (2006.01) |
| *A43B 7/1445* | (2022.01) |

(52) U.S. Cl.
CPC ............ *A43B 13/206* (2013.01); *A43B 7/144* (2013.01); *A43B 7/1445* (2013.01); *A43B 13/203* (2013.01); *F16K 11/076* (2013.01); *F16K 15/1848* (2021.08); *F16K 15/20* (2013.01); *Y10T 137/86533* (2015.04); *Y10T 137/87901* (2015.04)

(58) Field of Classification Search
CPC ........... F16L 55/18; B05B 7/1486; C23C 4/04
See application file for complete search history.

(56) References Cited

U.S. PATENT DOCUMENTS

| | | |
|---|---|---|
| 510,504 A | 12/1893 | Foster |
| 572,887 A | 12/1896 | Gallagher |
| 586,155 A | 7/1897 | Bascom |
| (Continued) | | |

FOREIGN PATENT DOCUMENTS

| | | |
|---|---|---|
| CN | 2115676 U | 9/1992 |
| CN | 1153622 A | 7/1997 |
| (Continued) | | |

OTHER PUBLICATIONS

Oct. 4, 2019—(EP) Extended European Search Reportion in EP App. No. 19183008.2.

(Continued)

*Primary Examiner* — Kevin R Barss
(74) *Attorney, Agent, or Firm* — Banner & Witcoff, Ltd.

(57) ABSTRACT

An adjustable multiple bladder system for an article of footwear is disclosed. The bladder system includes an outer bladder that may be inflated using an external pump. A valve member is disposed within the outer bladder and divides the outer bladder into two distinct inflation chambers. The inflation chambers may be inflated separately.

18 Claims, 16 Drawing Sheets

Related U.S. Application Data continuation of application No. 13/081,091, filed on Apr. 6, 2011, now Pat. No. 9,060,564.

(56) References Cited

U.S. PATENT DOCUMENTS

| | | |
|---|---|---|
| 586,166 A | 7/1897 | Bascom |
| 1,010,187 A | 11/1911 | Scott |
| 1,011,460 A | 12/1911 | Maddocks |
| 1,069,001 A | 7/1913 | Guy |
| 1,304,915 A | 5/1919 | Spinney |
| 1,498,838 A | 6/1924 | Harrison, Jr. |
| 1,557,947 A | 10/1925 | Stewart |
| 2,007,803 A | 7/1935 | Kelly |
| 2,109,180 A | 2/1938 | Mohun |
| 2,762,134 A | 9/1956 | Town |
| 3,469,576 A | 9/1969 | Smith et al. |
| 3,721,265 A | 3/1973 | Hoffland |
| 4,129,951 A | 12/1978 | Petrosky |
| 4,183,156 A | 1/1980 | Rudy |
| 4,219,945 A | 9/1980 | Rudy |
| 4,237,625 A | 12/1980 | Cole et al. |
| 4,358,902 A | 11/1982 | Cole et al. |
| 4,446,634 A | 5/1984 | Johnson et al. |
| 4,657,716 A | 4/1987 | Schmidt |
| 4,670,995 A | 6/1987 | Huang |
| 4,712,316 A | 12/1987 | Baggio |
| 4,722,131 A | 2/1988 | Huang |
| 4,763,426 A | 8/1988 | Polus et al. |
| 4,856,208 A | 8/1989 | Zaccaro |
| 4,887,367 A | 12/1989 | Mackness et al. |
| 4,912,861 A | 4/1990 | Huang |
| 4,936,029 A | 6/1990 | Rudy |
| 4,991,317 A | 2/1991 | Lakic |
| 5,025,575 A | 6/1991 | Lakic |
| 5,042,176 A | 8/1991 | Rudy |
| 5,083,361 A | 1/1992 | Rudy |
| 5,113,599 A | 5/1992 | Cohen et al. |
| 5,144,708 A | 9/1992 | Pekar |
| 5,179,792 A | 1/1993 | Brantingham |
| 5,193,246 A | 3/1993 | Huang |
| 5,199,191 A | 4/1993 | Moumdjian |
| 5,224,278 A | 7/1993 | Jeon |
| 5,228,156 A | 7/1993 | Wang |
| 5,238,231 A | 8/1993 | Huang |
| 5,253,435 A | 10/1993 | Auger et al. |
| 5,257,470 A | 11/1993 | Auger et al. |
| 5,295,313 A | 3/1994 | Lee |
| 5,335,382 A | 8/1994 | Huang |
| 5,351,710 A | 10/1994 | Phillips |
| 5,355,552 A | 10/1994 | Huang |
| 5,384,977 A | 1/1995 | Chee |
| 5,406,661 A | 4/1995 | Pekar |
| 5,543,194 A | 8/1996 | Rudy |
| 5,558,395 A | 9/1996 | Huang |
| 5,564,143 A | 10/1996 | Pekar et al. |
| 5,588,227 A | 12/1996 | Goldston et al. |
| 5,590,696 A | 1/1997 | Phillips et al. |
| 5,598,645 A | 2/1997 | Kaiser |
| 5,669,161 A | 9/1997 | Huang |
| 5,713,141 A | 2/1998 | Mitchell et al. |
| 5,740,619 A | 4/1998 | Broder |
| 5,741,568 A | 4/1998 | Rudy |
| 5,794,361 A | 8/1998 | Sadler |
| 5,802,738 A | 9/1998 | Ferniani |
| 5,802,739 A | 9/1998 | Potter et al. |
| 5,813,142 A | 9/1998 | Demon |
| 5,830,553 A | 11/1998 | Huang |
| 5,845,417 A | 12/1998 | Reed et al. |
| 5,846,063 A | 12/1998 | Lakic |
| 5,902,660 A | 5/1999 | Huang |
| 5,907,911 A | 6/1999 | Huang |
| 5,918,383 A | 7/1999 | Chee |
| 5,925,306 A | 7/1999 | Huang |
| 5,937,462 A | 8/1999 | Huang |
| 5,952,065 A | 9/1999 | Mitchell et al. |
| 5,979,078 A | 11/1999 | McLaughlin |
| 5,987,779 A | 11/1999 | Litchfield et al. |
| 5,996,253 A | 12/1999 | Spector |
| 6,013,340 A | 1/2000 | Bonk et al. |
| 6,014,823 A | 1/2000 | Lakic |
| 6,027,683 A | 2/2000 | Huang |
| 6,065,150 A | 5/2000 | Huang |
| 6,082,025 A | 7/2000 | Bonk et al. |
| 6,119,371 A | 9/2000 | Goodwin et al. |
| D431,347 S | 10/2000 | Bettencourt |
| 6,127,010 A | 10/2000 | Rudy |
| 6,127,026 A | 10/2000 | Bonk et al. |
| 6,128,837 A | 10/2000 | Huang |
| 6,134,812 A | 10/2000 | Voss |
| 6,161,240 A | 12/2000 | Huang |
| 6,170,173 B1 | 1/2001 | Caston |
| 6,203,868 B1 | 3/2001 | Bonk et al. |
| 6,282,815 B1 | 9/2001 | Caston |
| 6,298,499 B1 | 10/2001 | Huang |
| 6,305,102 B1 | 10/2001 | Doyle |
| 6,314,663 B1 | 11/2001 | Saldana |
| 6,321,465 B1 | 11/2001 | Bonk et al. |
| 6,391,405 B1 | 5/2002 | Bonk et al. |
| 6,428,865 B1 | 8/2002 | Huang |
| 6,430,843 B1 | 8/2002 | Potter et al. |
| 6,460,197 B2 | 10/2002 | Huang |
| 6,510,624 B1 | 1/2003 | Lakic |
| 6,519,873 B1 | 2/2003 | Buttigieg |
| 6,537,639 B1 | 3/2003 | Huang |
| 6,553,691 B2 | 4/2003 | Huang |
| 6,557,271 B1 | 5/2003 | Weaver, III |
| 6,571,490 B2 | 6/2003 | Tawney et al. |
| 6,585,669 B2 | 7/2003 | Manor et al. |
| 6,725,573 B2 | 4/2004 | Doyle |
| 6,730,379 B2 | 5/2004 | Bonk et al. |
| 6,773,785 B1 | 8/2004 | Huang |
| 6,782,640 B2 | 8/2004 | Westin |
| 6,785,985 B2 | 9/2004 | Marvin et al. |
| 6,865,825 B2 | 3/2005 | Bailey, Sr. et al. |
| 6,889,451 B2 | 5/2005 | Passke et al. |
| 6,915,594 B2 | 7/2005 | Kim |
| 6,971,193 B1 | 12/2005 | Potter et al. |
| 6,976,321 B1 | 12/2005 | Lakic |
| 6,988,329 B2 | 1/2006 | Marvin et al. |
| 7,017,285 B2 | 3/2006 | Lakic |
| 7,047,670 B2 | 5/2006 | Marvin et al. |
| 7,051,456 B2 | 5/2006 | Swigart et al. |
| 7,070,845 B2 | 7/2006 | Thomas et al. |
| 7,107,706 B1 | 9/2006 | Bailey, Sr. et al. |
| 7,131,218 B2 | 11/2006 | Schindler |
| 7,152,625 B2 | 12/2006 | Marvin et al. |
| 7,171,765 B2 | 2/2007 | Lo |
| 7,204,041 B1 | 4/2007 | Bailey, Sr. et al. |
| 7,244,483 B2 | 7/2007 | Tawney et al. |
| 7,254,909 B2 | 8/2007 | Ungari |
| 7,278,445 B2 | 10/2007 | Marvin et al. |
| 7,337,560 B2 | 3/2008 | Marvin et al. |
| 7,340,851 B2 | 3/2008 | Litchfield et al. |
| 7,383,648 B1 | 6/2008 | Litchfield et al. |
| 7,395,614 B1 | 7/2008 | Bailey, Sr. et al. |
| 7,395,615 B2 | 7/2008 | Lee |
| 7,409,780 B2 | 8/2008 | Marvin et al. |
| 7,448,150 B1 | 11/2008 | Davis et al. |
| 7,451,554 B2 | 11/2008 | Hazenberg et al. |
| 7,451,555 B1 | 11/2008 | Lakic |
| 7,478,488 B1 | 1/2009 | Davis et al. |
| 7,784,196 B1 | 8/2010 | Christensen et al. |
| 8,813,389 B2 | 8/2014 | Gishifu et al. |
| 8,844,165 B2 | 9/2014 | Gishifu et al. |
| 9,060,564 B2 | 6/2015 | Langvin et al. |
| 9,420,849 B2 | 8/2016 | Gishifu et al. |
| 9,526,299 B2 | 12/2016 | Gishifu et al. |
| 9,737,113 B2 | 8/2017 | Gishifu et al. |
| 2001/0045026 A1 | 11/2001 | Huang |
| 2002/0053146 A1 | 5/2002 | Swigart |
| 2002/0121031 A1 | 9/2002 | Smith et al. |
| 2002/0164257 A1 | 11/2002 | Baek |
| 2002/0194747 A1 | 12/2002 | Passke et al. |
| 2003/0098118 A1 | 5/2003 | Rapaport |

(56) References Cited

U.S. PATENT DOCUMENTS

| | | |
|---|---|---|
| 2004/0010939 A1 | 1/2004 | Liu et al. |
| 2004/0088882 A1 | 5/2004 | Buttigieg |
| 2005/0039346 A1 | 2/2005 | Thomas et al. |
| 2005/0097777 A1 | 5/2005 | Goodwin |
| 2005/0102858 A1 | 5/2005 | Yen |
| 2005/0183287 A1 | 8/2005 | Schindler |
| 2005/0198862 A1 | 9/2005 | Lo |
| 2005/0241185 A1 | 11/2005 | Flood et al. |
| 2006/0174518 A1 | 8/2006 | Fogarty et al. |
| 2006/0196081 A1 | 9/2006 | Lee |
| 2006/0225304 A1 | 10/2006 | Goodwin |
| 2008/0066342 A1 | 3/2008 | Park |
| 2008/0163517 A1 | 7/2008 | Chen |
| 2008/0222916 A1 | 9/2008 | Jin |
| 2009/0288312 A1 | 11/2009 | Dua |
| 2009/0288313 A1 | 11/2009 | Rapaport et al. |
| 2010/0242303 A1 | 9/2010 | Callahan et al. |
| 2011/0067264 A1 | 3/2011 | Doyle |
| 2012/0084998 A1 | 4/2012 | Biesse |
| 2012/0255196 A1 | 10/2012 | Gishifu et al. |

FOREIGN PATENT DOCUMENTS

| | | |
|---|---|---|
| CN | 2394475 Y | 9/2000 |
| CN | 1430476 A | 7/2003 |
| CN | 1592589 A | 3/2005 |
| CN | 1856262 A | 11/2006 |
| CN | 201182250 Y | 1/2009 |
| CN | 101744411 A | 6/2010 |
| CN | 101932260 A | 12/2010 |
| CN | 102379481 A | 3/2012 |
| DE | 2855268 A1 | 7/1980 |
| EP | 0576734 A1 | 1/1994 |
| FR | 2801174 A1 | 5/2001 |
| FR | 2898017 A1 | 9/2007 |
| WO | 8703789 A1 | 7/1987 |
| WO | 9119430 A1 | 12/1991 |
| WO | 9314659 A1 | 8/1993 |
| WO | 963886 A1 | 2/1996 |
| WO | 0119211 A1 | 3/2001 |
| WO | 200178539 A2 | 10/2001 |
| WO | 2009027941 A2 | 3/2009 |

OTHER PUBLICATIONS

International Search Report and Written Opinion dated Oct. 19, 2012, in International Application No. PCT/US2012/030721.
International Search Report and Written Opinion dated Oct. 22, 2012, in International Application No. PCT/US2012/030724.
International Search Report and Written Opinion dated Oct. 25, 2012, in International Application No. PCT/US2012/030726.
International Search Report and Written Opinion dated Oct. 26, 2012 in International Application No. PCT/US2012/030718.
International Preliminary Report on Patentability (including Written Opinion of the ISA) dated Oct. 17, 2013, in International Application No. PCT/US2012/030726.
International Preliminary Report on Patentability (including Written Opinion of the ISA) dated Oct. 17, 2013 in International Application No. PCT/US2012/030718.
International Preliminary Report on Patentability (including Written Opinion of the ISA) dated Oct. 17, 2013 in International Application No. PCT/US2012/030721.
International Preliminary Report on Patentability (including Written Opinion of the ISA) dated Oct. 17, 2013 in International Application No. PCT/US2012/030724.
International Preliminary Report on Patentability and Written Opinion for Application No. PCT/US2012/030718, dated Oct. 17, 2013.
International Preliminary Report on Patentability and Written Opinion for Application No. PCT/US2012/030721, dated Oct. 17, 2013.
International Preliminary Report on Patentability and Written Opinion for Application No. PCT/US2012/030724, dated Oct. 17, 2013.
International Preliminary Report on Patentability and Written Opinion for Application No. PCT/US2012/030726, dated Oct. 17, 2013.
International Search Report and Written Opinion for Application No. PCT/US2012/030718, dated Oct. 26, 2012.
International Search Report and Written Opinion for Application No. PCT/US2012/030721, dated Oct. 19, 2012.
International Search Report and Written Opinion for Application No. PCT/US2012/030724, dated Oct. 22, 2012.
International Search Report and Written Opinion for Application No. PCT/US2012/030726, dated Oct. 25, 2012.

ADJUSTABLE MULTI-BLADDER SYSTEM FOR AN ARTICLE OF FOOTWEAR

CROSS-REFERENCE TO RELATED APPLICATION

This application is a continuation of U.S. patent application Ser. No. 15/643,892, titled "Adjustable Multi-Bladder System for an Article of Footwear" and filed Jul. 7, 2017, which is a divisional application of U.S. patent application Ser. No. 14/730,319, titled "Adjustable Multi-Bladder System for an Article of Footwear" and filed on Jun. 4, 2015, now U.S. Pat. No. 9,730,488, which is a continuation of U.S. patent application Ser. No. 13/081,091, titled "Adjustable Multi-Bladder System for an Article of Footwear" and filed Apr. 6, 2011, now U.S. Pat. No. 9,060,564, all of which, in their entirety, are incorporated by reference herein.

BACKGROUND

The present embodiments relate generally to an article of footwear, and in particular to an article of footwear with a bladder system.

SUMMARY

In one aspect, a bladder system for an article of footwear, comprises a sole structure; an outer bladder including an interior cavity; a valve member disposed inside the interior cavity, the valve member being used to inflate the interior cavity; and where the valve member divides the interior cavity into a first inflation chamber and a second inflation chamber and wherein the first inflation chamber and the second inflation chamber can be inflated to different pressures.

In another aspect, a bladder system for an article of footwear, comprises: a sole structure; an outer bladder including an interior cavity; a valve member disposed inside the interior cavity, the valve member being used to inflate the interior cavity; the valve member dividing the interior cavity into a first inflation chamber and a second inflation chamber; the valve member including a first fluid passage in fluid communication with a first valve; the valve member including a second fluid passage in fluid communication with the first inflation chamber and a third fluid passage in fluid communication with the second inflation chamber; the valve member including a second valve; and where a first position of the second valve provides fluid communication between the first fluid passage and the second fluid passage and wherein a second position of the second valve provides fluid communication between the first fluid passage and the third fluid passage.

In another aspect, a bladder system for an article of footwear, comprises: a sole structure; an outer bladder including an interior cavity; the interior cavity being divided into a first inflation chamber and a second inflation chamber by a valve member, wherein the first inflation chamber and the second inflation chamber can be inflated to different pressures; the valve member including a valve used to control the flow of fluid into the first inflation chamber and the second inflation chamber; and where an outer surface of the valve is exposed on a lower portion of the sole structure and wherein the outer surface can be engaged to adjust the valve.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
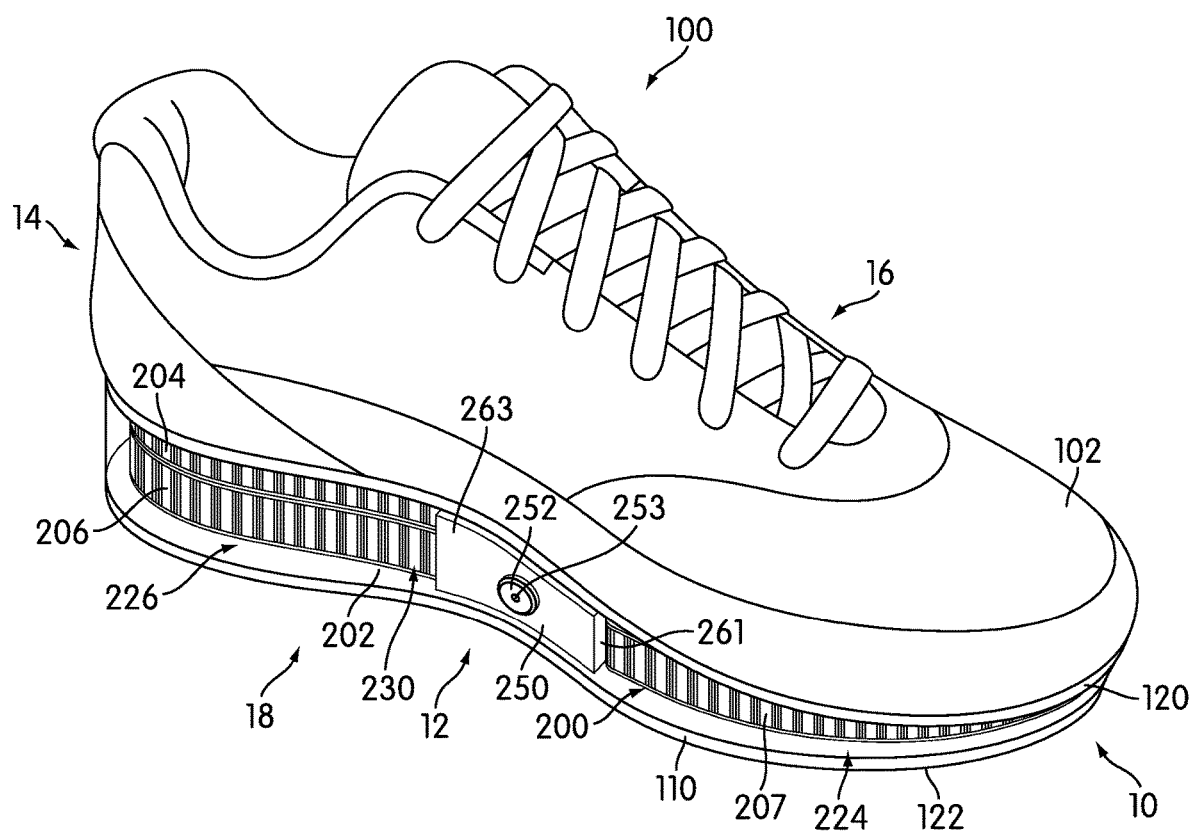
FIG. 1 is an isometric view of an embodiment of an article of footwear with a bladder system.

FIGS. 1 through 4 illustrate views of an exemplary embodiment of article of footwear 100. For clarity, the following detailed description discusses an exemplary embodiment, in the form of a sports shoe, but it should be noted that the present embodiments could take the form of any article of footwear including, but not limited to: hiking boots, soccer shoes, football shoes, sneakers, rugby shoes, basketball shoes, baseball shoes as well as other kinds of shoes. As shown in FIGS. 1 through 4, article of footwear 100, also referred to simply as article 100, is intended to be used with a left foot; however, it should be understood that the following discussion may equally apply to a mirror image of article of footwear 100 that is intended for use with a right foot.

Referring to FIGS. 1 through 4, for purposes of reference, article 100 may be divided into forefoot portion 10, midfoot portion 12 and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, article 100 may include lateral side 16 and medial side 18. In particular, lateral side 16 and medial side 18 may be opposing sides of article 100. Furthermore, both lateral side 16 and medial side 18 may extend through forefoot portion 10, midfoot portion 12 and heel portion 14.

It will be understood that forefoot portion 10, midfoot portion 12 and heel portion 14 are only intended for purposes of description and are not intended to demarcate precise regions of article 100. Likewise, lateral side 16 and medial side 18 are intended to represent generally two sides of an article, rather than precisely demarcating article 100 into two halves. In addition, forefoot portion 10, midfoot portion 12 and heel portion 14, as well as lateral side 16 and medial side 18, can also be applied to individual components of an article, such as a sole structure and/or an upper.

For consistency and convenience, directional adjectives are employed throughout this detailed description corresponding to the illustrated embodiments. The term "longitudinal" as used throughout this detailed description and in the claims refers to a direction extending a length of an article. In some cases, the longitudinal direction may extend from a forefoot portion to a heel portion of the article. Also, the term "lateral" as used throughout this detailed description and in the claims refers to a direction extending a width of an article. In other words, the lateral direction may extend between a medial side and a lateral side of an article. Furthermore, the term "vertical" as used throughout this detailed description and in the claims refers to a direction generally perpendicular to a lateral and longitudinal direction. For example, in cases where an article is planted flat on a ground surface, the vertical direction may extend from the ground surface upward. In addition, the term "proximal" refers to a portion of a footwear component that is closer to a portion of a foot when an article of footwear is worn. Likewise, the term "distal" refers to a portion of a footwear component that is further from a portion of a foot when an article of footwear is worn. It will be understood that each of these directional adjectives may be applied to individual components of an article, such as an upper and/or a sole structure.

Article 100 can include upper 102 and sole structure 110. Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper.

In some embodiments, sole structure 110 may be configured to provide traction for article 100. In addition to providing traction, sole structure 110 may attenuate ground reaction forces when compressed between the foot and the ground during walking, running or other ambulatory activities. The configuration of sole structure 110 may vary significantly in different embodiments to include a variety of conventional or non-conventional structures. In some cases, the configuration of sole structure 110 can be configured according to one or more types of ground surfaces on which sole structure 110 may be used. Examples of ground surfaces include, but are not limited to: natural turf, synthetic turf, dirt, as well as other surfaces.

Sole structure 110 is secured to upper 102 and extends between the foot and the ground when article 100 is worn. In different embodiments, sole structure 110 may include different components. For example, sole structure 110 may include an outsole, a midsole, and/or an insole. In some cases, one or more of these components may be optional. In an exemplary embodiment, sole structure 110 may include midsole 120 and outsole 122.

In some cases, midsole 120 may be attached directly to upper 102. In other cases, midsole 120 may be attached to a sockliner associated with upper 102. In different embodiments, midsole 120 may have different material characteristics to provide various levels of comfort, cushioning and/or shock absorption. Examples of different materials that could be used for midsole 120 include, but are not limited to: foam, rubber, plastic, polymers, as well as any other kinds of materials.

In some cases, outsole 122 may be configured to provide traction for sole structure 110 and article 100. Outsole 122 can include one or more tread elements and/or ground penetrating members such as cleats. Outsole 122 can have different material characteristics to provide varying levels of traction with a ground surface. Examples of different materials that could be used for outsole 122 include, but are not limited to: plastic, rubber, polymers as well as any other kinds of materials that are both durable and wear resistant.

A sole structure can include provisions for enhancing cushioning and shock absorption for an article of footwear. Article 100 may include bladder system 200. Generally, bladder system 200 may be disposed in any portion of article 100. In some cases, bladder system 200 may be disposed in forefoot portion 10 of sole structure 110. In other cases, bladder system 200 may be disposed in midfoot portion 12 of sole structure 110. In still other cases, bladder system 200 may be disposed in heel portion 14 of sole structure 100. In an exemplary embodiment, bladder system 200 may be a full length bladder system that extends from heel portion 14 to forefoot portion 10 of sole structure 110.

Bladder system 200 may include outer bladder 202. Outer bladder 202 may comprise one or more layers that are generally impermeable to fluid. In the current embodiment, outer bladder 202 comprises upper layer 220 and lower layer 222 (see FIG. 3) that are joined together at first periphery 221 and second periphery 223. Moreover, upper layer 220 and lower layer 222 comprise a boundary surface that encloses interior cavity 230.

Referring back to FIGS. 1 through 4, in some embodiments, bladder system 200 may include one or more structures disposed within outer bladder 202 to provide enhanced support and help maintain a substantially constant shape for outer bladder 202. In some cases, bladder system 200 may include one or more tensile members. In some cases, bladder system 200 may include a set of stacked tensile members.

In the current embodiment, bladder system 200 includes first tensile member 204, second tensile member 206 and third tensile member 207. Although three tensile members are used in the current embodiment, other embodiments could include a single tensile member. Still other embodiments could include two tensile members or more than three tensile members.

Figure 2:
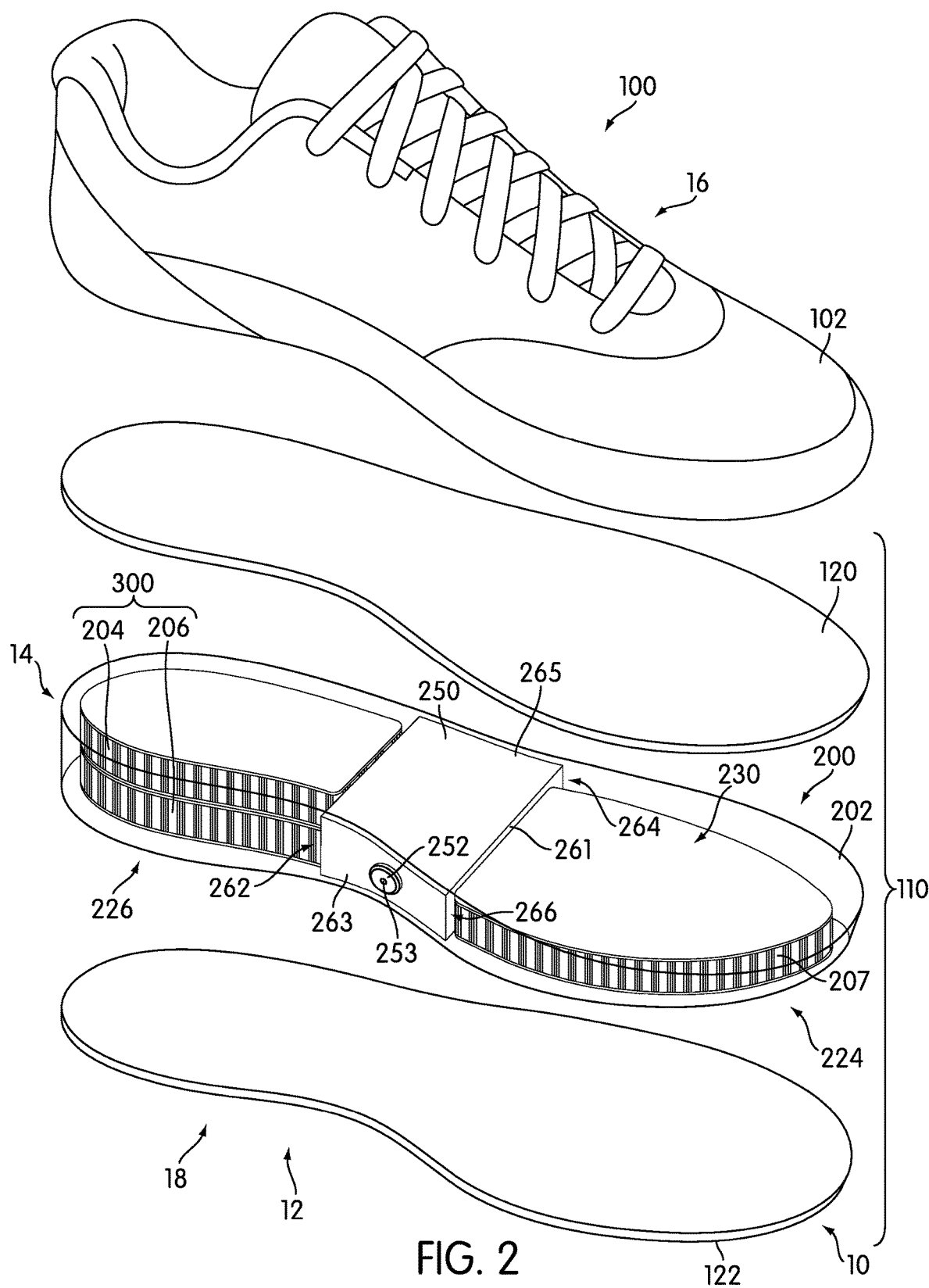
FIG. 2 an isometric exploded view of an embodiment of an article of footwear with a bladder system.
Figure 3:
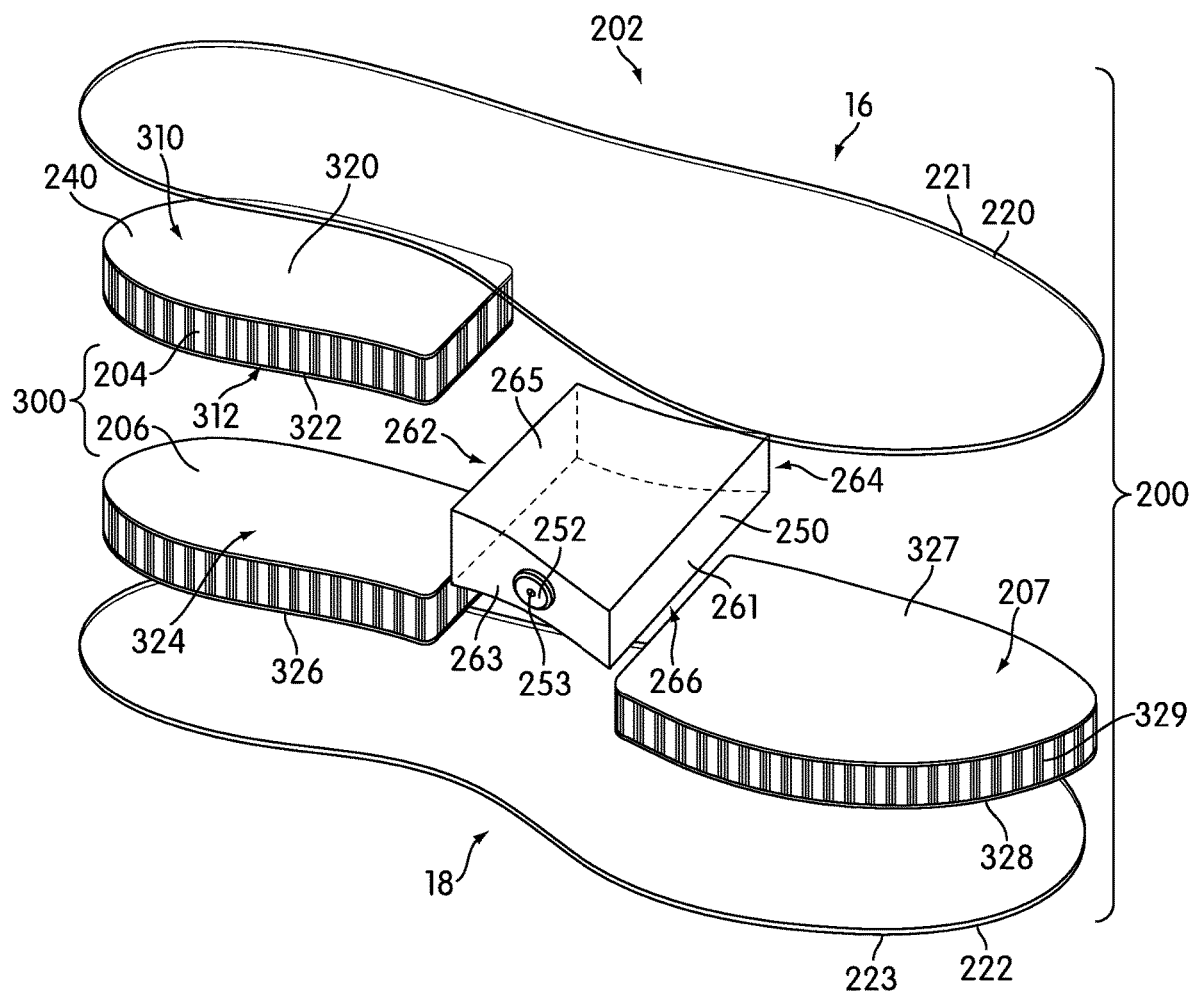
FIG. 3 is an isometric exploded view of an embodiment of a bladder system.
Figure 4:
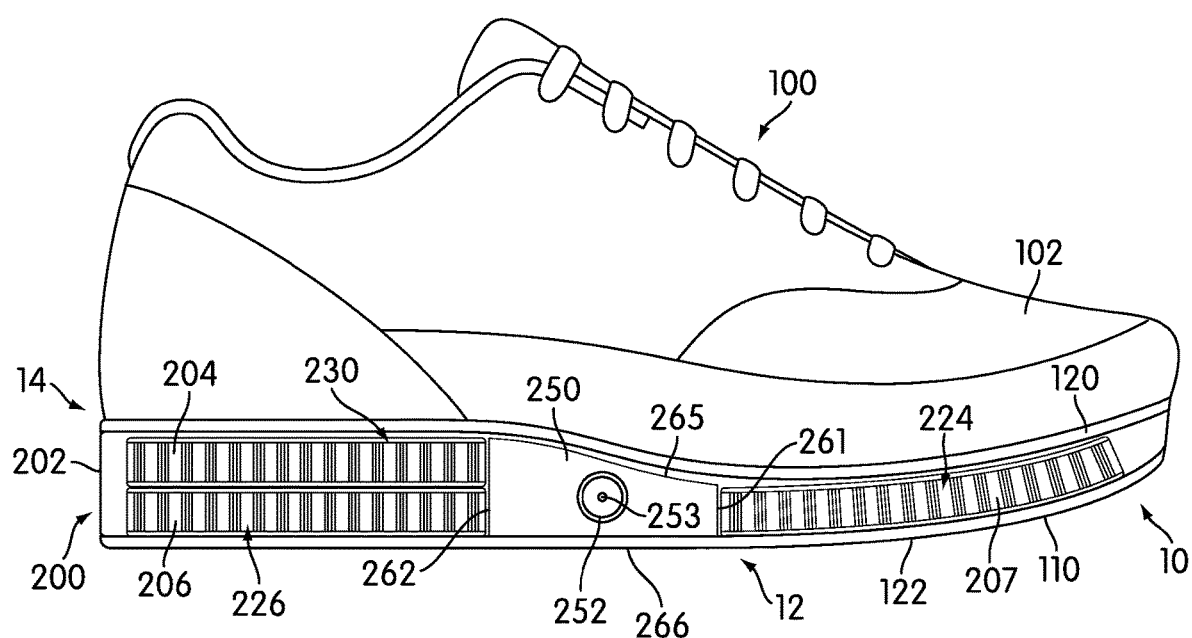
FIG. 4 is a side view of an embodiment of an article of footwear with a bladder system.

Referring now to FIGS. 2 and 3, in order to provide stability and support, first tensile member 204 and second tensile member 206 may be arranged as a stacked tensile member 300 at heel portion 14 of bladder system 200. In some cases, stacked tensile member 300 may be disposed in interior cavity 230 of outer bladder 202. In some cases, first tensile member 204 and second tensile member 206 may be stacked in an approximately vertical direction (that is a direction perpendicular to both the longitudinal and lateral directions of article 100).

Referring to FIG. 3, first tensile member 204 and second tensile member 206 may be spaced textiles (or spacer-knit textiles). In particular, first tensile member 204 and second tensile member 206 may include textile layers 310 as well as connecting members 312 that extend between the textile layers 310. For example, first tensile member 204 includes first textile layer 320 and second textile layer 322, while second tensile member 206 includes third textile layer 324 and fourth textile layer 326. In some cases, first textile layer 320 may be attached to upper layer 220 of outer bladder 202. Additionally, in some cases, fourth textile layer 326 may be attached to lower layer 222 of outer bladder 202. Furthermore, in some cases, second textile layer 322 and third textile layer 324 may be attached to one another to join first tensile member 204 and second tensile member 206.

Third tensile member 207 may include textile layers and connecting members. In this case, third tensile member 207 includes fifth textile layer 327 and sixth textile layer 328 that are attached to one another via connecting members 329. In some cases, fifth textile layer 327 and sixth textile layer 328 may be attached to upper layer 220 and lower layer 222 of outer bladder 202, respectively. In other cases, however, fifth textile layer 327 and sixth textile layer 328 may not be attached directly to outer bladder 202.

In some embodiments, third tensile member 207 may be disposed in forefoot portion 10 of bladder system 200. In contrast to first tensile member 204 and second tensile member 206 that form a stacked tensile member 300, third tensile member 207 may be the only tensile member used in forefoot portion 10 of bladder system 200. Using a single tensile member in forefoot portion 10 may help maintain a relatively low thickness for forefoot portion 10 of sole structure 110.

In some embodiments, first tensile member 204, second tensile member 206 and third tensile member 207 could be substantially similar to one another. In other embodiments, however, each tensile member could differ in size, shape, material characteristics as well as any other features. In the current embodiment, first tensile member 204, second tensile member 206 and third tensile member 207 may share substantially similar material and structural properties.

Using this arrangement, first tensile member 204, second tensile member 206 and third tensile member 207 may provide structural reinforcement for outer bladder 202. In particular, as a compression force is applied to outer bladder 202 at heel portion 14 (such as during heel contact with a ground surface) the outward force of fluid puts connecting members 312 in tension. This acts to prevent further outward movement of textile layers 310 and thereby prevents further outward movement of outer bladder 202 at heel portion 14. This arrangement helps to control the deformation of outer bladder 202, which might otherwise be fully compressed during heel strikes with a ground surface. In a similar manner, third tensile member 207 may help to restrict the motion of outer bladder 202 at forefoot portion 10 in order to maintain a substantially constant height and shape for forefoot portion 10 of sole structure 110.

Examples of different configurations for a bladder including tensile members are disclosed in Swigart, U.S. Pat. No. 9,161,592, the entirety of which is hereby incorporated by reference. Further examples are disclosed in Dua, U.S. Pat. No. 8,151,486 and Rapaport et al., U.S. Pat. No. 8,241,451, the entirety of both being hereby incorporated by reference. An example of configurations for tensile members manufactured using a flat-knitting process is disclosed in Dua, U.S. Pat. No. 8,151,486, the entirety of which is hereby incorporated by reference.

Bladder system 200 can include valve member 250 that facilitates the inflation of outer bladder 202. Valve member 250 is disposed within interior cavity 230 of outer bladder 202. Valve member 250 comprises a plug-like portion that receives valve 252 and supports the transfer of fluid into outer bladder 202. In some embodiments, valve member 250 may be substantially more rigid than outer bladder 202. This arrangement helps protect valve 252 as well as any tubing or fluid lines connected to valve 252.

For purposes of describing valve member 250, valve member 250 may be characterized by a plurality of surfaces (see FIG. 3). In the current embodiment, valve member 250 includes first surface 261, second surface 262, third surface 263, fourth surface 264, fifth surface 265 and sixth surface 266. First surface 261 is a forwardly oriented surface and second surface 262 is a rearwardly oriented surface. Third surface 263 is a medial surface and fourth surface 264 is a lateral surface. Fifth surface 265 is an upper surface and sixth surface 266 is a lower surface.

Valve 252 may be partially inserted into orifice 289 (see FIG. 6) of third surface 263. In addition, valve 252 may include fluid port 253 that is exposed on an outer surface of outer bladder 202. In some cases, valve 252 may protrude through a portion of outer bladder 202 so that valve 252 can engage with an external pump. In an exemplary embodiment, outer bladder 202 is sealed around valve 252 so that no fluid can escape.

Generally, valve 252 may be any type of valve that is configured to engage with an external pump of some kind. In one embodiment, valve 252 could be a Schrader valve. In another embodiment, valve 252 could be a Presta valve. In still other embodiments, valve 252 could be any other type of valve known in the art.

A bladder system can include provisions for dividing an outer bladder into distinct portions. In some cases, an outer bladder can be divided into one or more inflation chambers that are substantially separate from one another. In one embodiment, a valve member can be used to divide an outer bladder into two distinct inflation chambers.

In the current embodiment, valve member 250 is configured to divide interior cavity 230 into first inflation chamber 224 and second inflation chamber 226. In particular, upper layer 220 and lower layer 222 of outer bladder 202 are configured to attach directly to third surface 263, fourth surface 264, fifth surface 265 and sixth surface 266.

Outer bladder 202 may be attached to valve member 250 in any manner. In some cases, upper layer 220 and lower layer 222 may be bonded to surfaces of valve member 250 using one or more adhesives. In other cases, upper layer 220 and lower layer 222 may be bonded to surfaces of valve member 250 in any other manner. In still other cases, upper layer 220 and lower layer 222 may not be attached directly to valve member 250, and instead valve member 250 may be squeezed between upper layer 220 and lower layer 222 in a substantially air-tight manner.

Figure 5:
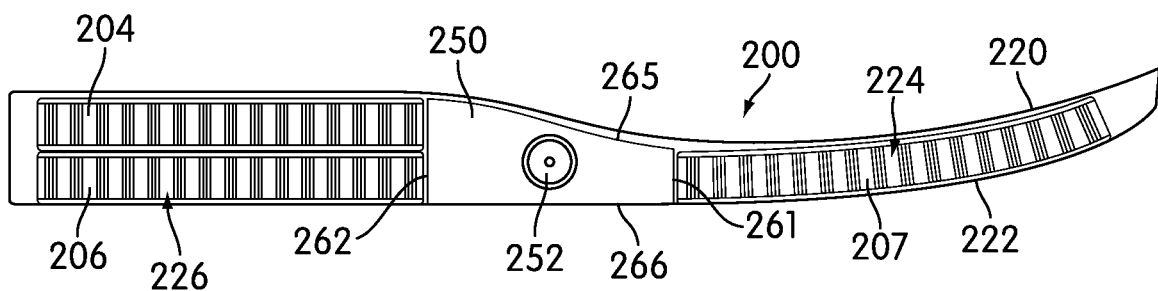
FIG. 5 is a side view of an embodiment of a bladder system.

Using this configuration, valve member 250 prevents fluid communication between first inflation chamber 224 and second inflation chamber 226. As seen in FIG. 5, which illustrates an isolated view of an embodiment of bladder system 200, first inflation chamber 224 is bounded by portions of upper layer 220, lower layer 222 and first surface 261 of valve member 250. Likewise, second inflation chamber 226 is bounded by portions of upper layer 220, lower layer 222 and second surface 262 of valve member 250.

In different embodiments, the material properties of valve member 250 could vary. In some cases, valve member 250 may comprise a material that is substantially impermeable to some kinds of fluids, including air. This arrangement helps to prevent fluid from being exchanged between first inflation chamber 224 and second inflation chamber 226 through permeation of valve member 250. However, in other cases, valve member 250 could comprise a material that is permeable to some types of fluid, including air. In one embodiment, the outer surface of valve member 250 could be coated with a material that is substantially impermeable to some types of fluids.

Generally, first inflation chamber 224 and second inflation chamber 226 may be associated with any portion of article 100. In some cases, first inflation chamber 224 may be associated with forefoot portion 10 of article 100. Likewise, second inflation chamber 226 may be associated with heel portion 14 of article 100. Because first inflation chamber 224 and second inflation chamber 226 can be inflated to different pressures, this configuration allows a user to selectively control the pressures associated with forefoot portion 10 and heel portion 14 of outer bladder 202.

In the current embodiment, first tensile member 204 and second tensile member 206 are disposed inside second inflation chamber 226. This configuration provides increased support for second inflation chamber 226. In other embodiments, however, first tensile member 204 and second tensile member 206 could be disposed in any other inflation chambers or any other portions of article 100. In addition, in this embodiment, third tensile member 207 is disposed in first inflation chamber 224 in order to provide increased support for outer bladder 202 at forefoot portion 10.

A bladder system can include provisions for selectively inflating one or more inflation chambers. In some cases, a valve member can be configured with a valve that can selectively provide fluid communication between an external pump and one or more inflation chambers.

Figure 6:
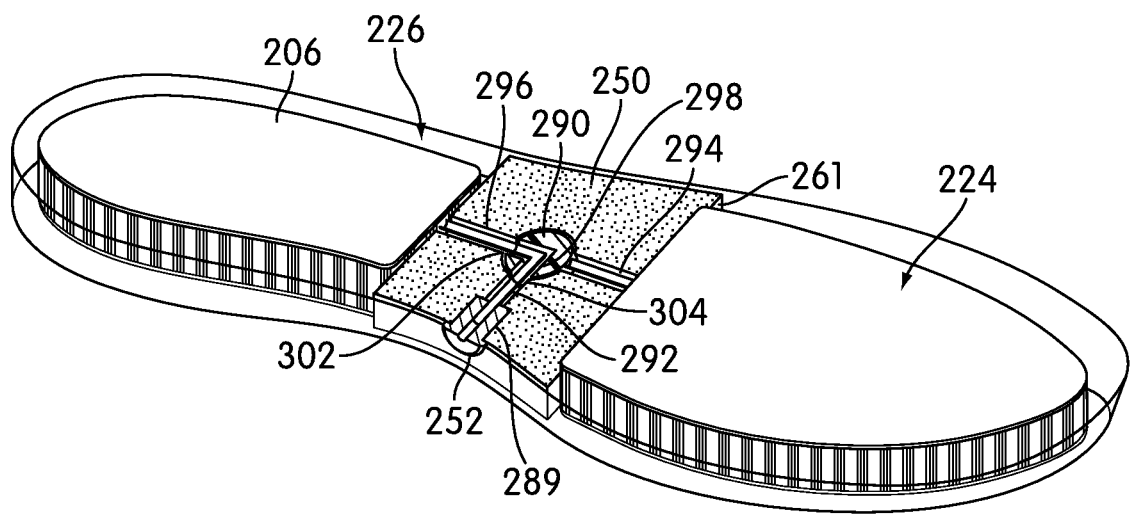
FIG. 6 is a cutaway view of an embodiment of a bladder system.
Figure 7:
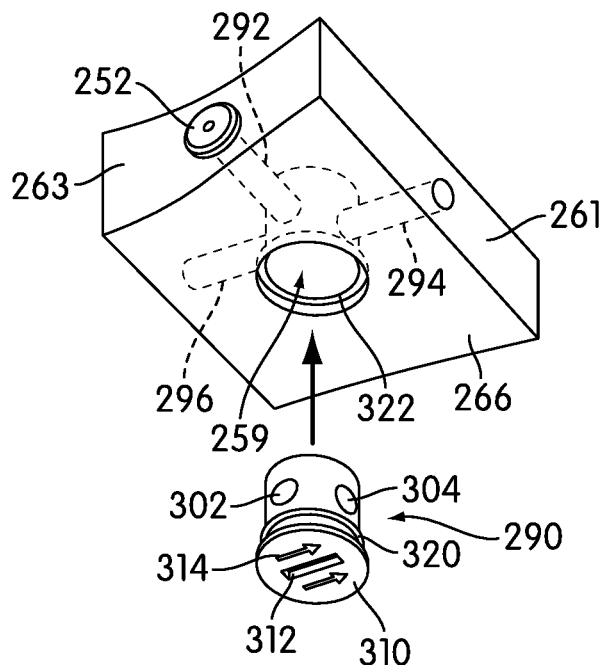
FIG. 7 is an isometric view of an embodiment of a lower side of a valve member.
Figure 8:
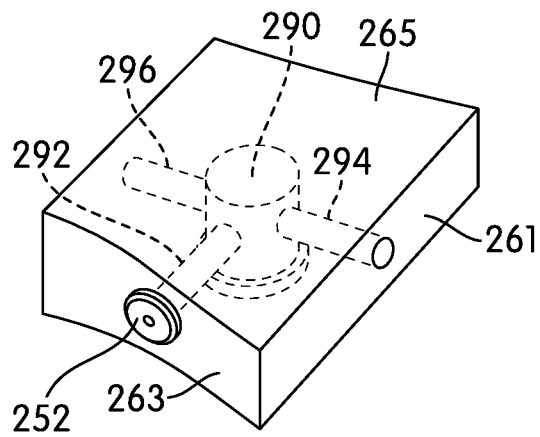
FIG. 8 is an isometric view of an embodiment of an upper side of a valve member.

Referring to FIGS. 6 through 8, valve member 250 may be provided with one or more fluid passages. In the current embodiment, valve member 250 may include first fluid passage 292, second fluid passage 294 and third fluid passage 296. In particular, first fluid passage 292 is a fluid passage that extends inwardly from valve 252. Second fluid passage 294 is a fluid passage that is in fluid communication with first inflation chamber 224. Third fluid passage 296 is a fluid passage that is in fluid communication with second inflation chamber 226.

It will be understood that in some cases, a tube or fluid line may be disposed within one or more fluid passages. In other cases, fluid may travel through one or more fluid passages directly, without the use of a separate tube or fluid line. In embodiments where valve member 250 is substantially impermeable to fluid, fluid passages may be used to transport fluid without additional fluid lines or tubes.

Valve member 250 may also be provided with valve 290 to provide fluid communication between first fluid passage 292 and either second fluid passage 294 or third fluid passage 296. Valve 290 may be any type of valve. In one embodiment, valve 290 could be a ball valve. In other embodiments, valve 290 could be any other kind of valve.

In the current embodiment, valve 290 may be screwed into central bore 259 of valve member 250. In some cases, valve 290 can include threading 320 that corresponds to threading 322 of central bore 259. In the exemplary embodiment, valve 290 is configured to rotate within valve member 250 at the intersection of first fluid passage 292, second fluid passage 294 and third fluid passage 296. Moreover, valve 290 is provided with central passage 298 that is open at first orifice 302 and second orifice 304. With this arrangement, valve 290 is configured to selectively connect either second fluid passage 294 or third fluid passage 296 to first fluid passage 292.

In a first rotated position for valve 290, first orifice 302 is in fluid communication with first fluid passage 292 and second orifice 304 is in fluid communication with second fluid passage 294. This allows fluid to flow between valve 252 and first inflation chamber 224. In a second rotated position for valve 290, first orifice 302 is in fluid communication with third fluid passage 296 and second orifice 304 is in fluid communication with first fluid passage 292. This allows fluid to flow between valve 252 and second inflation chamber 226.

Figure 9:
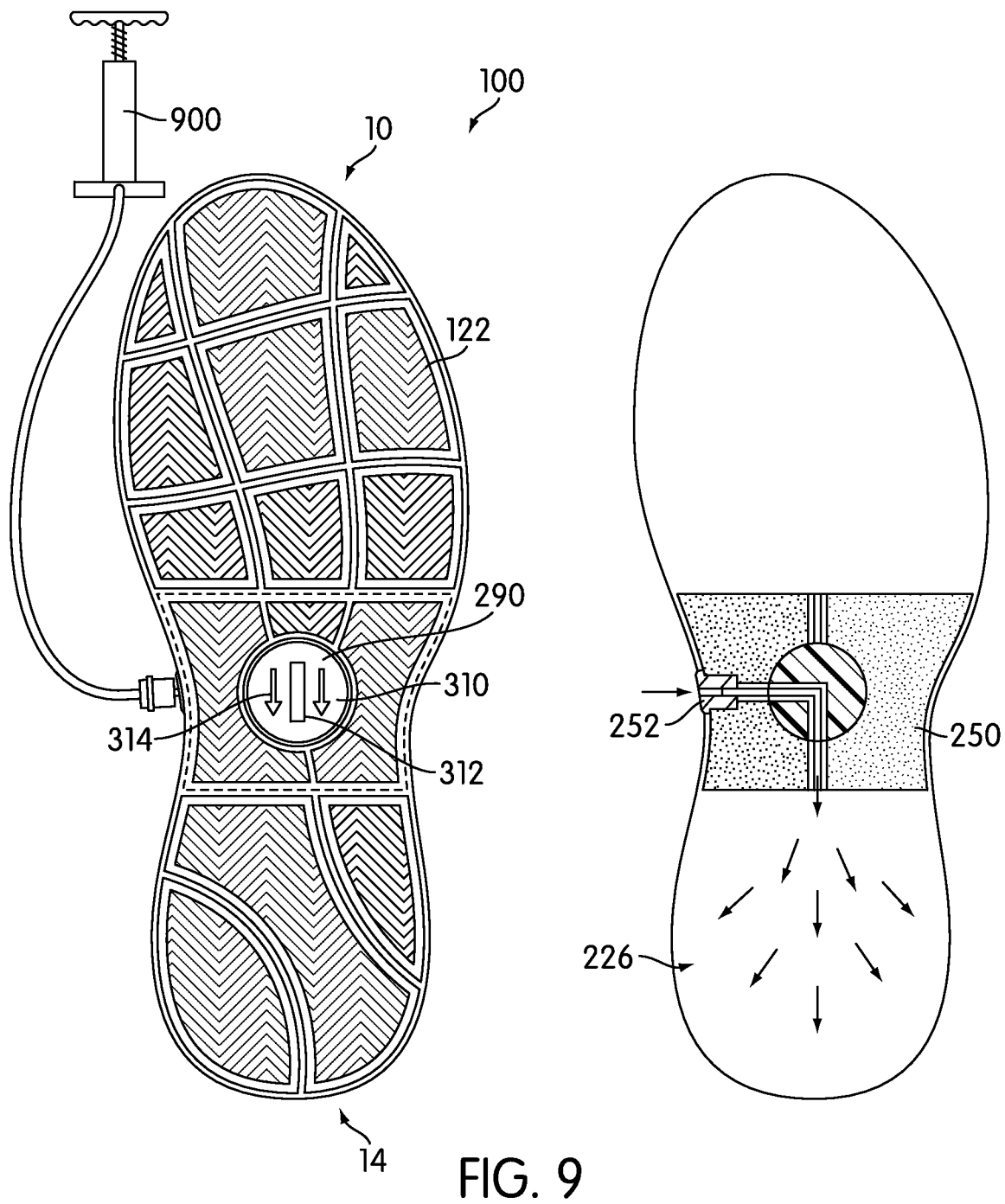
FIG. 9 is a schematic view of an embodiment of an inflation position for a bladder system configured to provide fluid to a heel portion of a bladder system.
Figure 10:
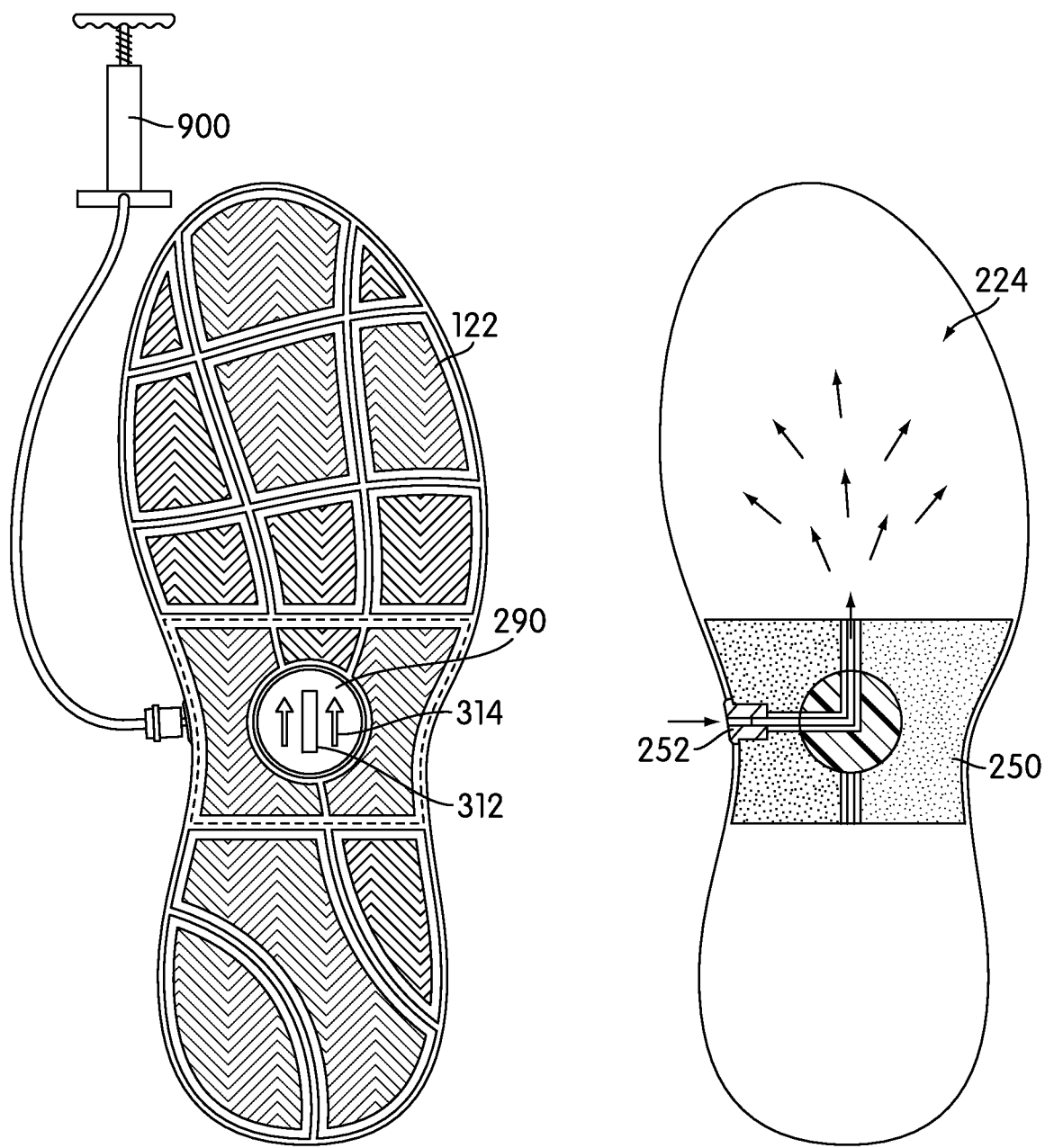
FIG. 10 is a schematic view of an embodiment of an inflation position for a bladder system configured to provide fluid to a forefoot portion of a bladder system.

Referring now to FIGS. 9 and 10, in some embodiments, the position of valve 290 may be adjusted manually. In one embodiment, outer surface 310 of valve 290 may be exposed on a lower portion of article 100. In particular, in the current embodiment, outer surface 310 may be exposed through a hole in outsole 122. Moreover, outer surface 310 may be provided with gripping portion 312 (see FIG. 7) that allows a user to grasp valve 290 in order to rotate the position of valve 290. In addition, in some cases, outer surface 310 could include one or more markings or indicia that indicate the relative position of valve 290. For example, in the current embodiment, arrow indicia 314 may be configured to indicate the relative position of valve 290.

Referring to FIG. 9, arrow indicia 314 is pointing in the direction of heel portion 14. This indicates to a user that when external pump 900 is used to inflate outer bladder 202, second inflation chamber 226, which is associated with heel portion 14, will be inflated. This is due to a first inflation position of valve 290, which is positioned to provide fluid communication between valve 252 and second inflation chamber 226.

In order to selectively inflate first inflation chamber 224, which corresponds to forefoot portion 10 of sole structure 110, a user may rotate valve 290 manually. As seen in FIG. 10, valve 290 has been manually rotated to a second inflation position for valve 290. In this second inflation position, valve 290 provides fluid communication between valve 252 and first inflation chamber 224. With this configuration, as external pump 900 is used to inflate outer bladder 202, first inflation chamber 224 is inflated.

Using this arrangement, first inflation chamber 224 and second inflation chamber 226 can be inflated to different pressures. In particular, since first inflation chamber 224 and second inflation chamber 226 are never directly in fluid communication with one another, the inflation pressure of each chamber can be separately controlled. This allows a user to independently adjust the inflation pressure of the forefoot and heel portions of an article of footwear by connecting an external pump to a single valve of the article and adjusting the flow of fluid into different regions of the sole structure using a valve.

Although the current embodiment illustrates valve 290 disposed on a lower surface of valve member 250, which is visible on a lower portion of article 100, in other embodiments, valve 290 could be disposed on any other portion of valve member 250. For example, in some cases, valve 290 could be associated with a medial or lateral surface of valve member 250. In such cases, a user could adjust valve 290 through an air-tight opening in outer bladder 202. In other cases, valve 290 could be associated with an upper surface of valve member 250. In such cases, valve 290 could be exposed inside of upper 102 beneath a sockliner or insert. In still other cases, valve 290 could be associated with any other surface of valve member 250 and any other portion of article 100.

Figure 11:
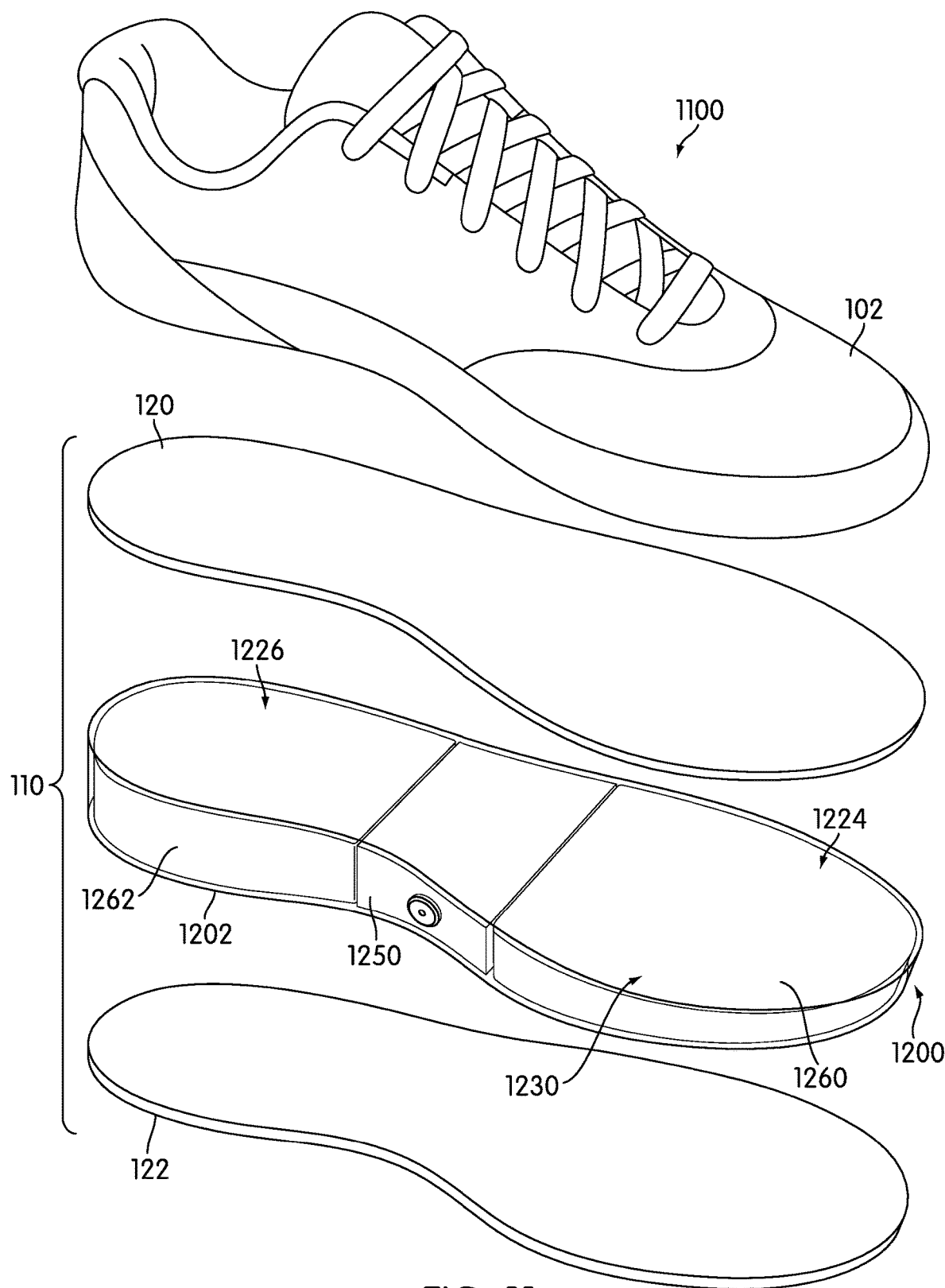
FIG. 11 is an isometric exploded view of an alternative embodiment an article of footwear with a bladder system.
Figure 12:
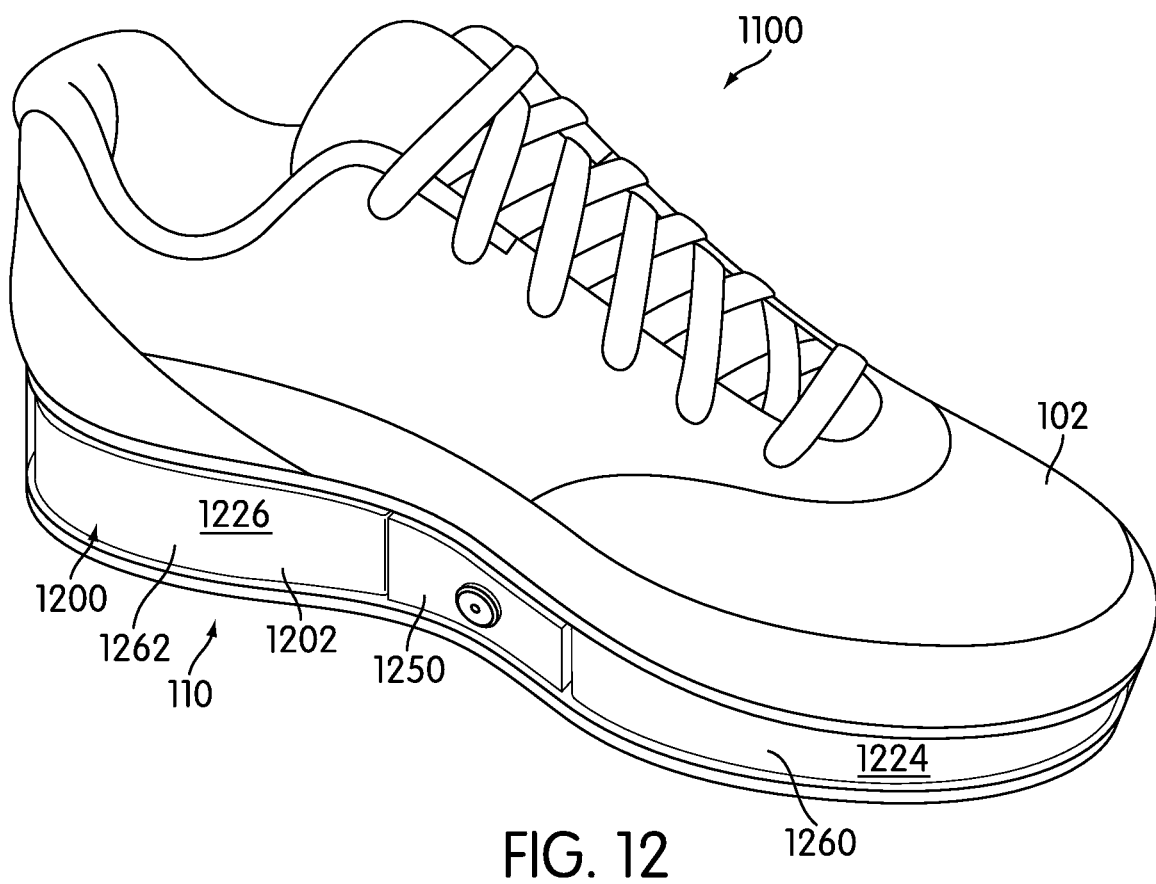
FIG. 12 is an isometric view of an alternative embodiment of an article of footwear with a bladder system.

Although the current embodiment utilizes one or more tensile members to provide enhanced structural support for portions of a bladder system, other embodiments may not include any tensile members. FIGS. 11 and 12 illustrate an alternative embodiment of article of footwear 1100. Article of footwear 1100, hereby simply referred to as article 1100, may be similar to article 100 in many respects. In particular, article of footwear 1000 comprises upper 102 and sole structure 110.

Article 1100 may also include bladder system 1200. Bladder system 1200 could be similar to bladder system 200 of the previous embodiment. Bladder system 1200 may include outer bladder 1202 as well as valve member 1250. Valve member 1250 may divide interior cavity 1230 into first inflation chamber 1224 and second inflation chamber 1226. In contrast to the previous embodiment, however, bladder system 1200 may not include any tensile members. Instead, bladder system 1200 may include first inner bladder 1260 and second inner bladder 1262 that are disposed in first inflation chamber 1224 and second inflation chamber 1226, respectively.

Generally, an inner bladder may be any type of bladder. In some cases, an inner bladder may be an inflatable bladder. In other cases, an inner bladder may not be inflatable. In other words, in some cases, the amount of fluid within the inner bladder may be fixed. In an exemplary embodiment, one or more inner bladders may be sealed bladders with approximately constant pressures. In particular, in some cases, the pressure of each inner bladder may be set at the time of manufacturing.

Examples of different types of bladders that could be used as inner bladders can be found in U.S. Pat. Nos. 6,119,371 and 5,802,738, both of which are hereby incorporated by reference. Moreover, the properties of one or more inner bladders could vary. Some may include internal structures that enhance support and maintain resiliency for the bladders. Other inner bladders may comprise a single outer layer that encloses an interior cavity. In still other embodiments, one or more inner bladders could have any other material and/or structural properties.

In different embodiments, the relative pressures of one or more bladders could vary. In one embodiment, first inner bladder 1260 and second inner bladder 1262 may be configured with substantially different internal pressures from outer bladder 1202. For example, in one embodiment, first inner bladder 1260 and second inner bladder 1262 could have internal pressures that are substantially greater than the maximum inflation pressure of outer bladder 1202. In other words, in some cases, the pressure of outer bladder 1202 may not be increased above the internal pressures of first inner bladder 1260 and second inner bladder 1262. Using this arrangement, first inner bladder 1260 and second inner bladder 1262 may be substantially stiffer than outer bladder 1802.

It will be understood that in other embodiments, the relative internal pressures of each bladder could vary. In other embodiments, for example, first inner bladder 1260 and second inner bladder 1262 could have internal pressures substantially equal to or less than the maximum inflation pressure associated with outer bladder 1202.

In still other embodiments, an outer bladder can be filled with any other kinds of structures that provide support and enhance the operation of a bladder system. Although the current embodiments show systems including tensile members and inner bladders, other embodiments could include any other kinds of support structures that can be placed inside a bladder. One example of a bladder with various kinds of support structures is disclosed in Peyton et al., U.S. Pat. No. 8,479,412, the entirety of which is hereby incorporated by reference. Another example is disclosed in Peyton, U.S. Pat. No. 8,381,418, the entirety of which is hereby incorporated by reference. An example of a bladder incorporating a foam tensile member is disclosed in Schindler, U.S. Pat. No. 7,131,218, the entirety of which is hereby incorporated by reference.

In different embodiments, a valve member could be configured to provide fluid to multiple different bladders disposed in a sole structure or other portions of an article. In some cases, a valve member can be provided with one or more valves that provide selective inflation for different bladders.

Figure 13:
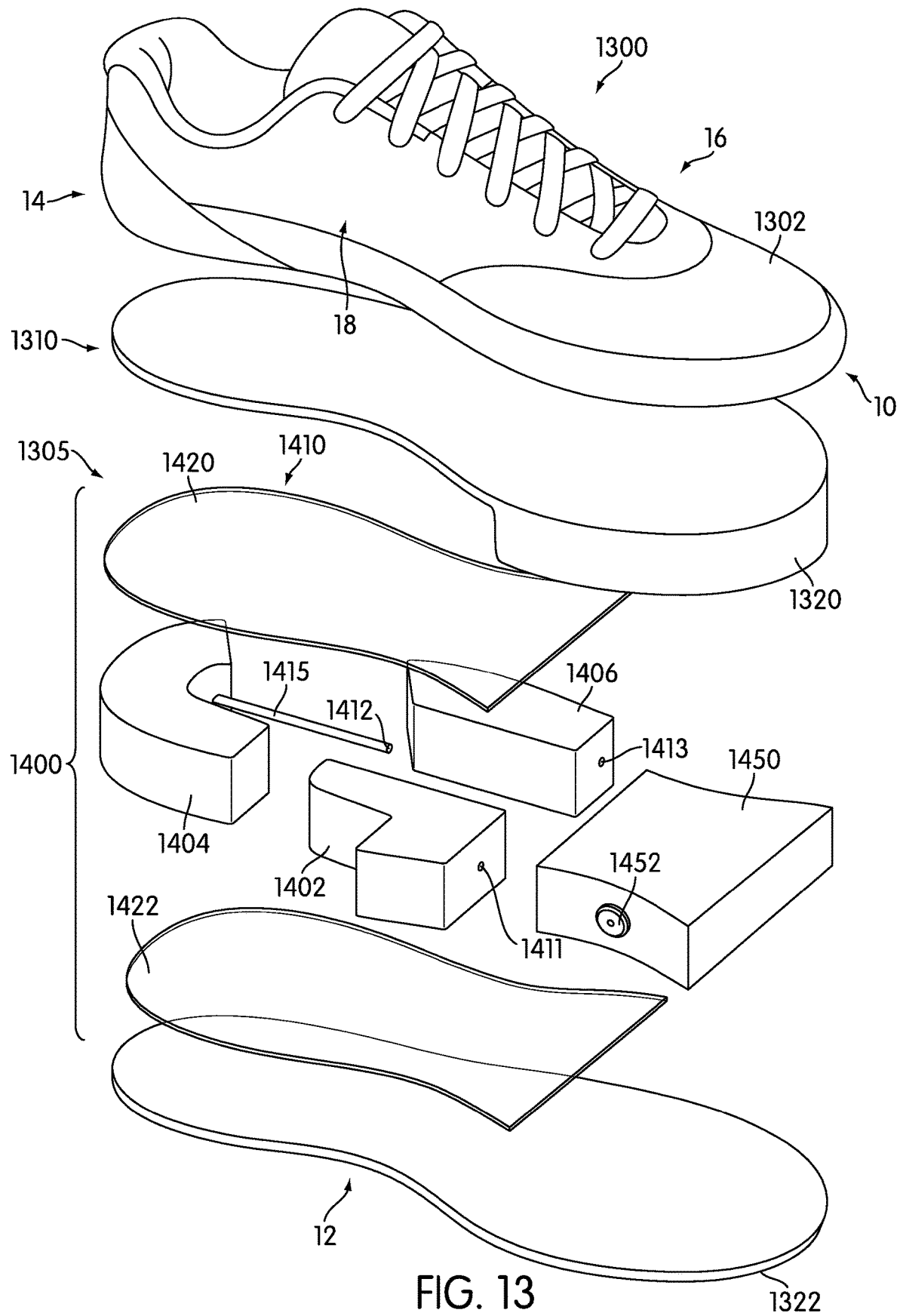
FIG. 13 is an isometric exploded view of an embodiment of an article of footwear with multiple bladders.
Figure 14:
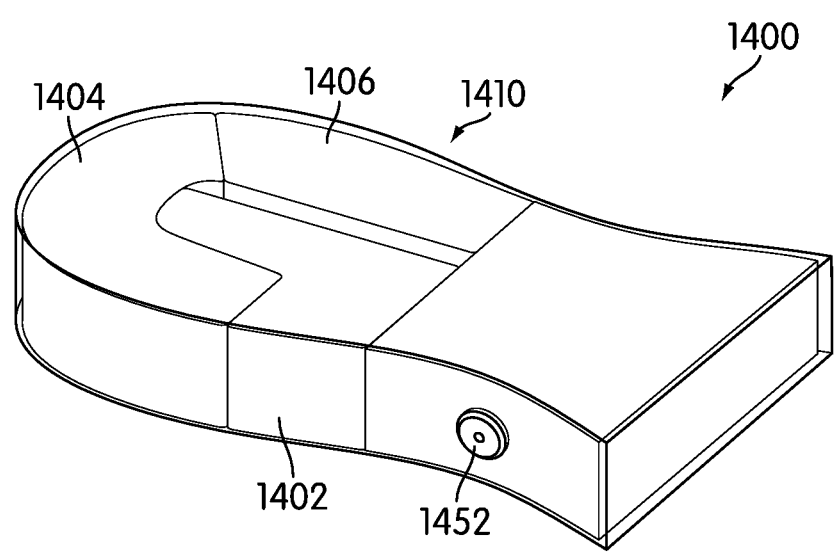
FIG. 14 is an isometric view of an embodiment of an article of footwear with multiple bladders.

FIGS. 13 and 14 illustrate an embodiment of an article of footwear including a bladder system. Referring to FIGS. 13 and 14, article of footwear 1300, hereby simply referred to as article 1300, includes upper 1302 and sole structure 1310. Upper 1302 and sole structure 1310 may be similar to upper 102 and sole structure 110 discussed in the earlier embodiments. Moreover, in the current embodiment, sole structure 1310 further includes midsole 1320 and outsole 1322.

A sole structure can include provisions for enhancing cushioning and shock absorption for an article of footwear. Article 1300 may include bladder system 1400. Generally, bladder system 1400 may be disposed in any portion of article 1300. In some cases, bladder system 1400 may be disposed in forefoot portion 10 of sole structure 1310. In other cases, bladder system 1400 may be disposed in midfoot portion 12 of sole structure 1310. In still other cases, bladder system 1400 may be disposed in heel portion 14 of sole structure 1310. In an exemplary embodiment, bladder system 1400 may extend through heel portion 14 and midfoot portion 12 of sole structure 1310.

Bladder system 1400 may include one or more bladders. In the current embodiment, bladder system 1400 includes first bladder 1402, second bladder 1404 and third bladder 1406. Generally, the sizes and shapes of first bladder 1402, second bladder 1404 and third bladder 1406 can vary. In the current embodiment, first bladder 1402, second bladder 1404 and third bladder 1406 can be shaped and sized to fit together within heel portion 14 of sole structure 1310. In particular, in the current embodiment, first bladder 1402 may be associated with medial side 18 of article 1300, second bladder 1404 may be associated with rear end portion 1305 of article 1300 and third bladder 1406 may be associated with lateral side 16 of article 1300. Although three bladders are shown in the current embodiment, in other embodiments, any other number of bladders could be used. Furthermore, bladders could be configured in any shapes and/or sizes.

Each of first bladder 1402, second bladder 1404 and third bladder 1406 may be configured with one or more orifices for receiving fluid. In this embodiment, first bladder 1402, second bladder 1404 and third bladder 1406 are configured with first orifice 1411, second orifice 1412 and third orifice 1413 for receiving fluid. Moreover, in the current embodiment, second orifice 1412 may be associated with extended tube 1415 that extends from a surface of second bladder 1404.

Bladder system 1400 can include valve member 1450 that facilitates the inflation of first bladder 1402, second bladder 1404 and third bladder 1406. Valve member 1450 comprises a plug-like portion that receives valve 1452 and supports the transfer of fluid into first bladder 1402, second bladder 1404 and third bladder 1406. In some embodiments, valve member 1450 may be substantially more rigid than first bladder 1402, second bladder 1404 and/or third bladder 1406. This arrangement helps protect valve 1452 as well as any tubing or fluid lines connected to valve 1452.

Generally, valve 1452 may be any type of valve that is configured to engage with an external pump of some kind. In one embodiment, valve 1452 could be a Schrader valve. In another embodiment, valve 1452 could be a Presta valve. In still other embodiments, valve 1452 could be any other type of valve known in the art.

In some embodiments, first bladder 1402, second bladder 1404 and third bladder 1404 as well as valve member 1450 may be encased within a larger outer bladder. In the current embodiment, outer bladder 1410 is configured to enclose first bladder 1402, second bladder 1404 and third bladder 1406. In addition, portions of valve member 1450 may also be disposed within outer bladder 1410. In the current embodiment, outer bladder 1410 comprises upper layer 1420 and lower layer 1422 that are joined together to form an outer envelope for bladder system 1400. In the current embodiment, outer bladder 1410 may not be separately inflatable from first bladder 1402, second bladder 1404 and third bladder 1406. In particular, in this case, outer bladder 1410 expands and contracts as each of first bladder 1402, second bladder 1404 and third bladder 1406 are inflated or deflated. However, in other embodiments, outer bladder 1410 could be separately inflatable.

Although the current embodiment includes an outer bladder encasing one or more bladders, in other embodiments no outer bladder may be used. Instead, first bladder 1402, second bladder 1404 and third bladder 1406 could be exposed on an outer surface of sole structure 1310.

Valve member 1450 can include provisions for selectively providing fluid communication between valve 1452 and one of first bladder 1402, second bladder 1404 and third bladder 1406. In some embodiments, valve member 1450 can be configured with a valve that can selectively provide fluid communication between an external pump and first bladder 1402, second bladder 1404 or third bladder 1406.

Figure 15:
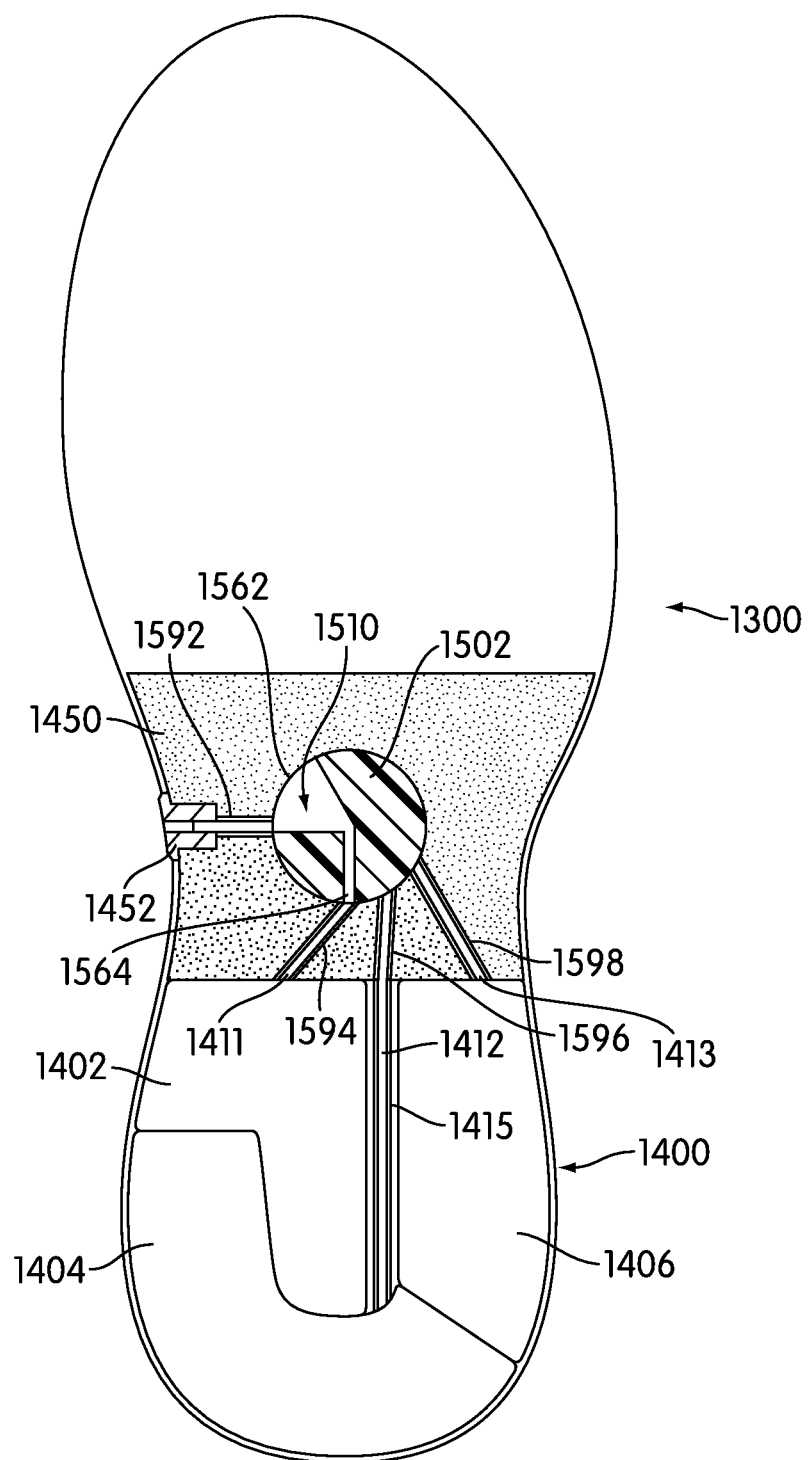
FIG. 15 is a cross-sectional view of an embodiment of an article of footwear with multiple bladders.

FIG. 15 illustrates a cross-sectional view of an embodiment of article 1300. Referring to FIG. 15, valve member 1450 may be provided with one or more fluid passages. In the current embodiment, valve member 1450 may include first fluid passage 1592, second fluid passage 1594, third fluid passage 1596 and fourth fluid passageway 1598. In particular, first fluid passage 1592 is a fluid passage that extends inwardly from valve 1452. Second fluid passage 1594 is a fluid passage that is in fluid communication with first orifice 1411 of first bladder 1402. Third fluid passage 1596 is a fluid passage that is in fluid communication with second orifice 1412 of second bladder 1404. In addition, fourth fluid passage 1598 is a fluid passage that is fluid communication with third orifice 1413 of third bladder 1406.

Valve member 1450 may also be provided with valve 1502 to provide fluid communication between first fluid passage 1592 and either second fluid passage 1594, third fluid passage 1596 or fourth fluid passage 1598. Valve 1502 may be any type of valve. In one embodiment, valve 1502 could be a ball valve. In another embodiment, valve 1502 may be a spider valve. In other embodiments, valve 1502 could be any other kind of valve. In the exemplary embodiment, valve 1502 is configured to rotate within valve member 1450 at the intersection of first fluid passage 1592, second fluid passage 1594, third fluid passage 1596 and fourth fluid passage 1598. Moreover, valve 1502 is provided with central passage 1510 that is configured to selectively connect either second fluid passage 1594, third fluid passage 1596 or fourth fluid passage 1598 to first fluid passage 1592.

In the current embodiment, valve 1502 is configured with first orifice 1562 and second orifice 1564. First orifice 1562 is a substantially wide opening that maintains fluid communication with first fluid passage 1592 in various inflation positions. Second orifice 1564 is a substantially narrow opening that maintains fluid communication with a single fluid passage in various inflation positions. As valve 1502 is rotated, fluid may continue to enter central passage 1510 from first fluid passage 1592 and may be directed to a single fluid passage from second fluid passage 1594, third fluid passage 1596 and fourth fluid passage 1598, as described in detail below.

Figure 16:
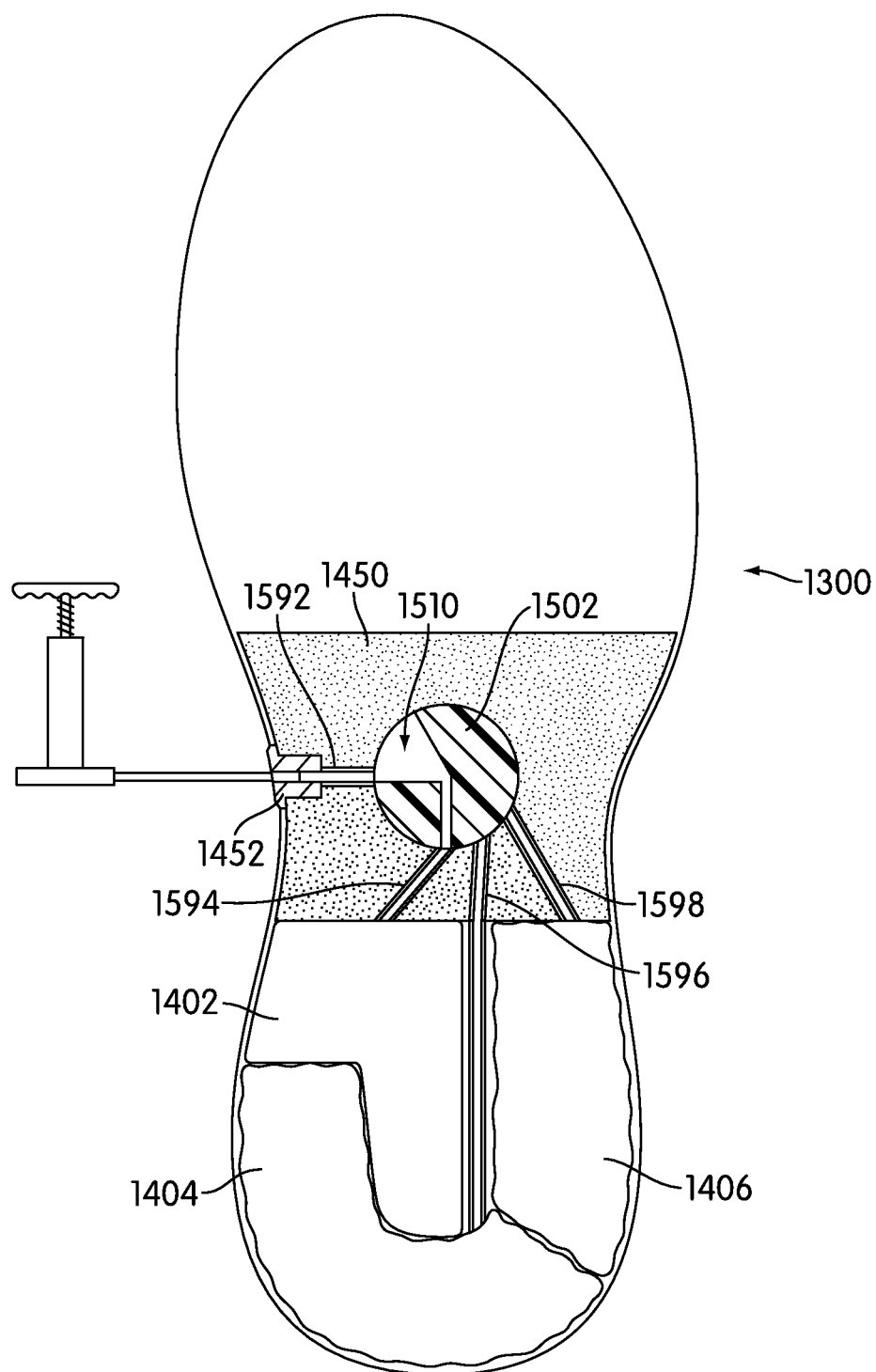
FIG. 16 is a cross-sectional view of an embodiment of an article of footwear with multiple bladders.
Figure 17:
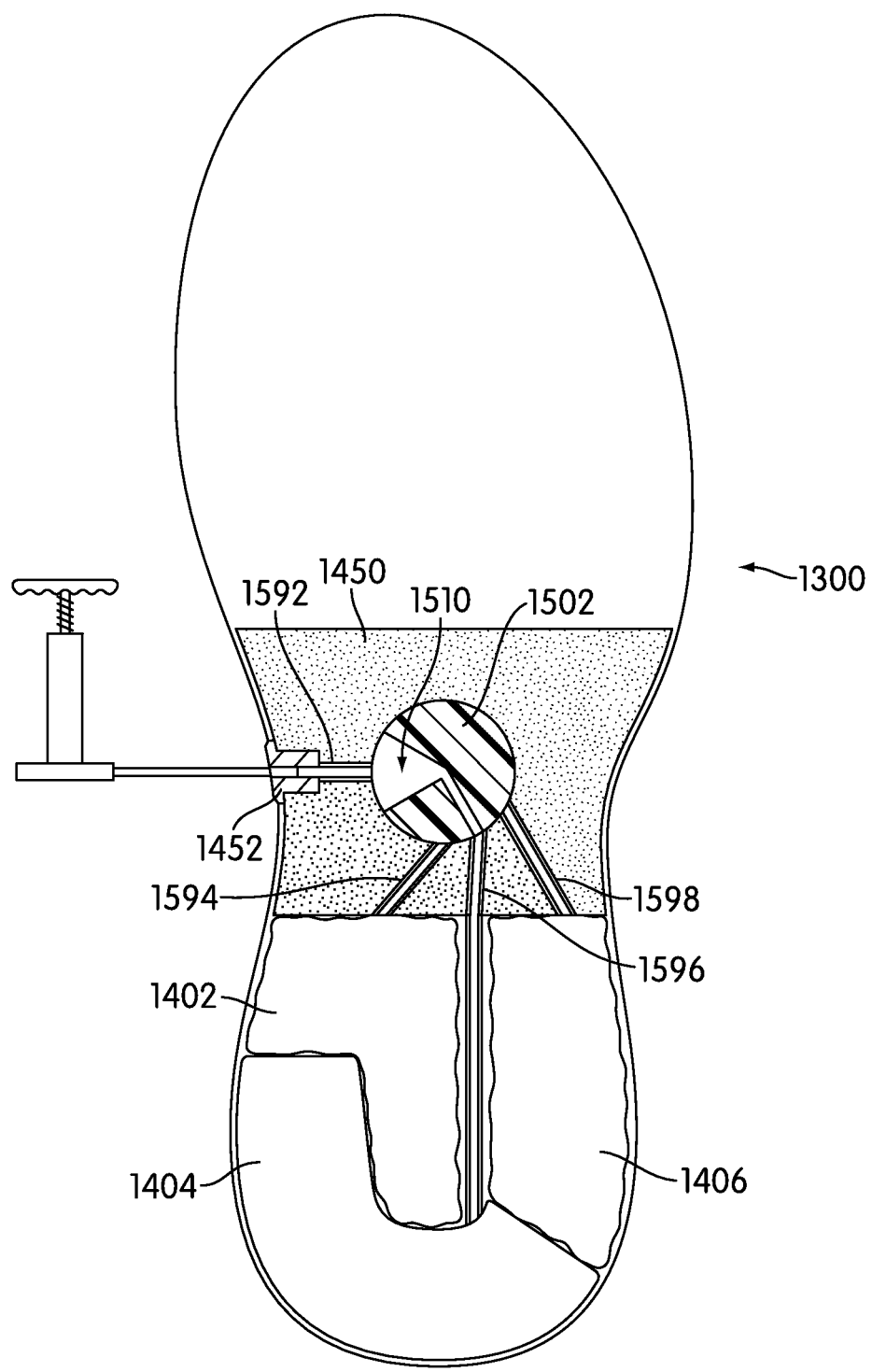
FIG. 17 is a cross-sectional view of an embodiment of an article of footwear with multiple bladders.
Figure 18:
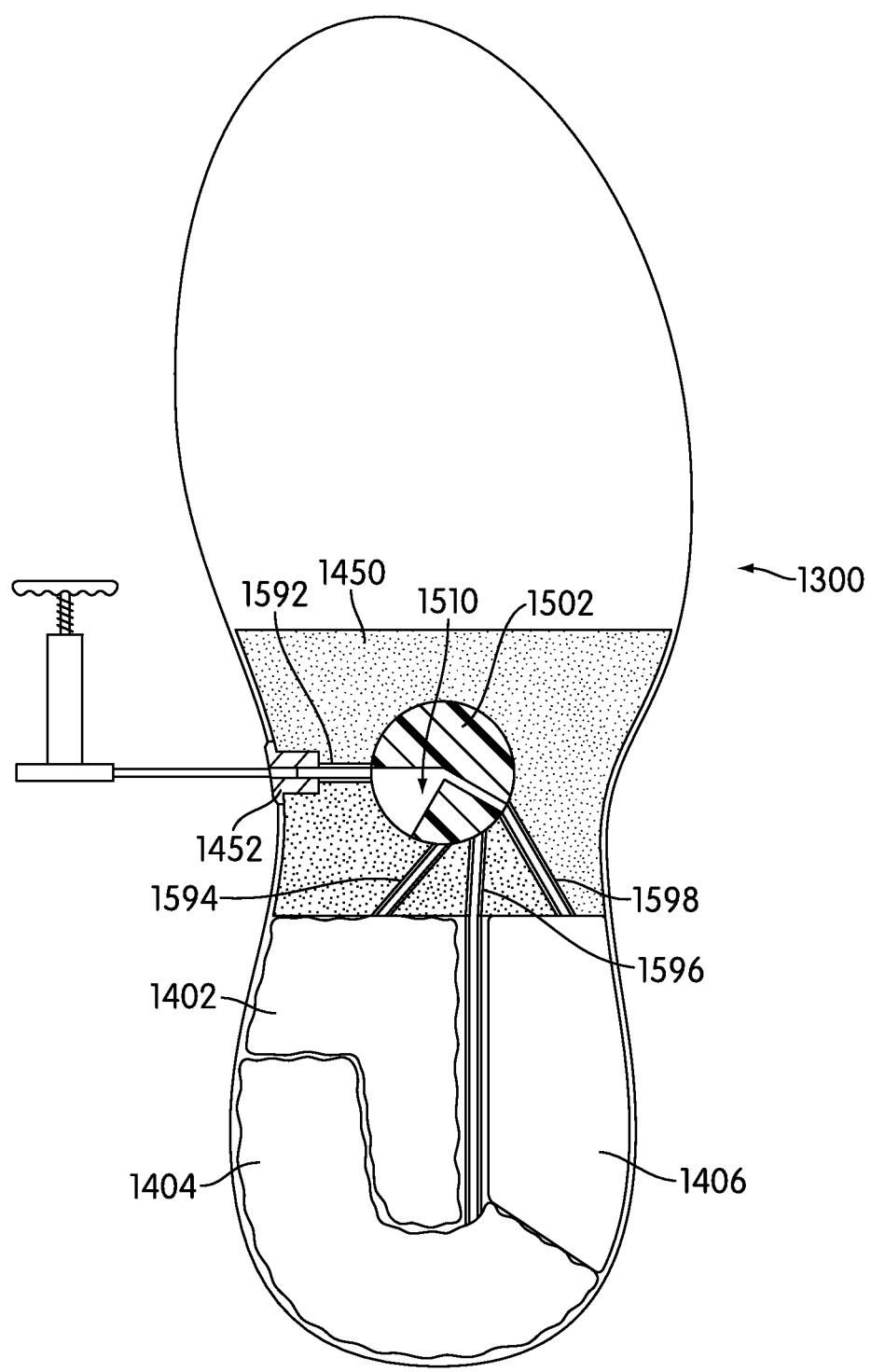
FIG. 18 is a cross-sectional view of an embodiment of an article of footwear with multiple bladders.

FIGS. 16 through 18 illustrate schematic embodiments of different positions for valve 1502. Referring to FIG. 16, valve 1502 is in a first inflation position. In this first inflation position, fluid may flow from an external pump into first bladder 1402. In particular, fluid may flow into valve 1452 from an external pump. From valve 1452, fluid may flow from first fluid passage 1592 through central passage 1510 and into second fluid passage 1594. From second fluid passage 1594 the fluid may flow into first bladder 1402. Referring now to FIG. 17, valve 1502 is in a second inflation position. In this second inflation position, fluid may flow from an external pump into second bladder 1404. In particular, fluid may flow into valve 1452 from an external pump. From valve 1452, fluid may flow from first fluid passage 1592 through central passage 1510 and into third fluid passage 1596. From third fluid passage 1596 the fluid may flow into second bladder 1404. Referring now to FIG. 18, valve 1502 is in a third inflation position. In this third inflation position, fluid may flow from an external pump into third bladder 1406. In particular, fluid may flow into valve 1452 from an external pump. From valve 1452, fluid may flow fluid may flow through first fluid passage 1592 through central passage 1510 and into fourth fluid passage 1598. From fourth fluid passage 1598 the fluid may flow into third bladder 1406.

Using this arrangement, a user may selectively inflate each of first bladder 1402, second bladder 1404 and third bladder 1406. In particular, each bladder may be inflated to different pressures to provide different cushioning characteristics for a medial side, lateral side, and rearward side of a heel.

Although a mechanism for operating valve 1502 is not explicitly illustrated, it will be understood that in some embodiments, valve 1502 could be operated in a substantially similar manner to the operation of valve 290 of the earlier embodiments. In particular, a portion of valve 1502 may be exposed on a lower surface of outsole 1322. Moreover, a user may twist valve 1502 to select between various different bladders.

Additionally, while the current embodiment includes three bladders disposed in a heel portion, in other embodiments, multiple bladders could be associated with various different portions of an article. Moreover, in some cases, a valve member could be configured to divide two or more bladders from one another in a manner similar to the configuration discussed earlier.

In still other embodiments, a multi-bladder system could be configured with a single inlet valve that inflates multiple bladders simultaneously. In order to achieve differential pressure within the different bladders, each bladder could be configured with an outlet valve that allows the pressure to be reduced to a desired internal pressure. In some cases, the outlet valve could be a pressure relief valve that automatically adjusts the internal pressure of the associated bladder so that the internal pressure of the bladder is never above a predetermined pressure.

While various embodiments of the embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A valve member for adjusting fluid pressure in a bladder system of an article of footwear, comprising:
a valve body defining: (a) a bore, (b) a first fluid passage extending to the bore, (c) a second fluid passage extending to the bore, and (d) a third fluid passage extending to the bore; and
a valve extending into the bore, wherein the valve includes: (a) a first orifice, (b) a second orifice, and (c) a passage connecting the first orifice and the second orifice,
wherein the valve is rotatably mounted with respect to the bore and is movable between a first rotated position and a second rotated position, wherein:
in the first rotated position, the first orifice is in fluid communication with the first fluid passage and the second orifice is in fluid communication with the second fluid passage, and
in the second rotated position, the first orifice is in fluid communication with the third fluid passage and the second orifice is in fluid communication with the first fluid passage.

2. The valve member of claim 1, further comprising:
a second valve located at an end of the first fluid passage opposite the bore.

3. The valve member of claim 2, wherein the second valve includes an exposed fluid port.

4. The valve member of claim 2, wherein the second valve is configured to engage with a pump.

5. The valve member of claim 4, wherein the second valve is a Presta valve or a Schrader valve.

6. The valve member according to claim 1, wherein an outer surface of the valve is exposed.

7. The valve member of claim 6, wherein the outer surface includes a gripping portion configured for use in rotating the valve between the first rotated position and the second rotated position.

8. The valve member of claim 6, wherein the outer surface includes indicia that indicates positioning of the valve.

9. The valve member of claim 1, wherein the valve includes threading that engages threading provided in the bore to enable rotation of the valve between the first rotated position and the second rotated position.

10. The valve member according to claim 1, wherein the valve includes first threading that engages second threading provided in the bore, wherein an outer surface of the valve is exposed and includes: (a) a gripping portion configured for use in rotating the valve via the first threading and the second threading between the first rotated position and the second rotated position and (b) indicia that indicates positioning of the valve.

11. A bladder system for an article of footwear, comprising:
a first inflation chamber;
a second inflation chamber;
a valve body defining: (a) a bore, (b) a first fluid passage extending to the bore, (c) a second fluid passage extending between the bore and the first inflation chamber, and (d) a third fluid passage extending between the bore and the second inflation chamber;
a first valve provided in the bore, wherein the first valve includes (a) a first orifice, (b) a second orifice, and (c) a passage connecting the first orifice and the second orifice, wherein the first valve is rotatably mounted with respect to the bore and is movable between a first rotated position and a second rotated position, wherein:
in the first rotated position of the first valve, the first orifice is in fluid communication with the first fluid passage and the second orifice is in fluid communication with the second fluid passage to allow fluid to flow between the first fluid passage and the first inflation chamber, and
in the second rotated position of the first valve, the first orifice is in fluid communication with the third fluid passage and the second orifice is in fluid communication with the first fluid passage to allow fluid flow between the first fluid passage and the second inflation chamber; and
a second valve located at an end of the first fluid passage opposite the bore.

12. The bladder system of claim 11, wherein the second valve includes an exposed fluid port.

13. The bladder system of claim 11, further comprising:
a pump, wherein the second valve is configured to engage the first fluid passage with the pump.

14. The bladder system of claim 13, wherein the second valve is a Presta valve or a Schrader valve.

15. A valve member for adjusting fluid pressure in a bladder system of an article of footwear, comprising:
a valve body defining: (a) a bore, (b) a first fluid passage extending to the bore, (c) a second fluid passage extending to the bore, and (d) a third fluid passage extending to the bore; and
a valve extending into the bore, wherein the valve includes: (a) a first opening, (b) a second opening, and (c) a passage connecting the first opening and the second opening,
wherein the valve is rotatably mounted with respect to the bore and is movable at least between a first rotated position and a second rotated position, wherein:
in the first rotated position, the first opening is in fluid communication with the first fluid passage and the second opening is in fluid communication with the second fluid passage, and
in the second rotated position, the first opening is in fluid communication with the first fluid passage and the second opening is in fluid communication with the third fluid passage.

16. A valve member according to claim 15, wherein the valve body further defines a fourth fluid passage extending to the bore, wherein the valve is further rotatable to a third rotated position, and wherein in the third rotated position, the first opening is in fluid communication with the first fluid passage and the second opening is in fluid communication with the fourth fluid passage.

17. The valve member of claim 15, further comprising:
a second valve located at an end of the first fluid passage opposite the bore.

18. The valve member of claim 17, wherein the second valve is configured to engage with a pump.

\* \* \* \* \*